(12) United States Patent
Kumar et al.

(10) Patent No.: US 11,914,931 B2
(45) Date of Patent: Feb. 27, 2024

(54) PREDICTING ON CHIP TRANSIENT THERMAL RESPONSE IN A MULTI-CHIP SYSTEM USING AN RNN-BASED PREDICTOR

(71) Applicant: ANSYS, INC., Canonsburg, PA (US)

(72) Inventors: Akhilesh Kumar, Milpitas, CA (US); Norman Chang, Fremont, CA (US); Hsiming Pan, San Jose, CA (US); Jimin Wen, Pleasanton, CA (US); Deqi Zhu, San Jose, CA (US); Wenbo Xia, Milpitas, CA (US); Wen-Tze Chuang, Yilan County (TW); En-Cih Yang, New Taipei (TW); Karthik Srinivasan, Cupertino, CA (US); Ying-Shiun Li, Pleasanton, CA (US)

(73) Assignee: ANSYS, INC., Canonsburg, PA (US)

(*) Notice: Subject to any disclaimer, the term of this patent is extended or adjusted under 35 U.S.C. 154(b) by 1028 days.

(21) Appl. No.: 16/730,421

(22) Filed: Dec. 30, 2019

(65) Prior Publication Data
US 2021/0200915 A1 Jul. 1, 2021

(51) Int. Cl.
*G06F 30/20* (2020.01)
*G06N 3/08* (2023.01)
*G06F 30/392* (2020.01)
*G06N 3/044* (2023.01)
*G06F 119/08* (2020.01)

(52) U.S. Cl.
CPC .......... *G06F 30/20* (2020.01); *G06F 30/392* (2020.01); *G06N 3/044* (2023.01); *G06N 3/08* (2013.01); *G06F 2119/08* (2020.01)

(58) Field of Classification Search
CPC .... G06F 30/20; G06F 30/392; G06F 2119/08; G06N 3/044; G06N 3/08
USPC .......................................................... 703/6
See application file for complete search history.

(56) References Cited

U.S. PATENT DOCUMENTS

| | | | |
|---|---|---|---|
| 8,019,580 B1* | 9/2011 | Chandra | G06F 30/33 703/13 |
| 11,334,700 B1* | 5/2022 | Wakefield | G06F 30/367 |
| 2012/0324408 A1* | 12/2012 | Shacham | G06F 30/30 716/102 |

OTHER PUBLICATIONS

Sultan_2019 (A survey of Chip-level Thermal Simulators, ACM Comput. Surv. 52, 2, Article 42 (Apr. 2019) (Year: 2019).*

* cited by examiner

*Primary Examiner* — Brian S Cook
(74) *Attorney, Agent, or Firm* — Womble Bond Dickinson (US) LLP

(57) ABSTRACT

Machine assisted systems and methods for enhancing the resolution of an IC thermal profile from a system analysis are described. The methods can include generating a representation of two or more templates identifying different portions of an integrated circuit (IC); performing a thermal simulation for each respective template of the IC based on a sequence of power patterns of tiles of the respective template; and training a neural network with a plurality of training data collected via thermal simulations performed for the templates of the IC. These systems and methods can use a machine learning predictor, that has been trained to determine a transient temperature rise across an entire IC, and then append the determined transient temperature rise to a system level thermal profile of the IC.

29 Claims, 21 Drawing Sheets

FIG. 2C

Transient power profiles for different blocks

PREDICTING ON CHIP TRANSIENT THERMAL RESPONSE IN A MULTI-CHIP SYSTEM USING AN RNN-BASED PREDICTOR

BACKGROUND

Accurate modeling of a transient thermal gradient is important for efficient and predictable integrated circuit (IC)-package-system performance and reliability. Thermal analysis is important for 3D-IC maximum temperature, Tmax and thermal-aware EM (Electro-Migration) sign-off. There are usually Tmax constraints on junction on-IC, skin Tmax of IC-package, and also placement of on-IC thermal sensor for DVFS (Dynamic Voltage and Frequency Control) design technique. On-IC temperature can also directly impact Electro-Migration, voltage drop, and timing.

However, obtaining a detailed and highly accurate thermal profile on an IC is time consuming using a direct thermal field solution such as Finite Element Method (FEM). Achieving a fine grained transient thermal profile with 10 µm grid size is not practical with system-level thermal solutions such as Computational Fluid Dynamics (CFD) simulation because of large runtime and capacity limitations. Further, there are many different switching scenarios (for example, system usage ways) that users may need to check top ranked Tmax on-IC.

A real time usage of any electronic system involves time varying power profile of the system. This will result in a transient thermal profile on the IC which cannot be practically computed in any reasonable time with CFD and FEM solvers with fine granularity. Multi-IC systems interact in a complex fashion and each IC affects the thermal profile of the neighboring ICs. This needs to be considered to accurately predict the transient Tmax on-IC. An active IC can impact the junction temperature on the other ICs in the system due to the heat being dissipated. It is important to consider this effect while generating the transient temperature profile for an IC.

Thus, Applicants have recognized that there a need for a system and related methods to speed up the on-IC thermal solution in a IC/package or more complicated 3DIC designs including multiple ICs. Also there is a need for fast thermal solution on IC-package-system to address various system usage scenarios and predict the transient behavior of the on IC temperature.

SUMMARY OF THE DESCRIPTION

Machine assisted systems and methods for use in a fast transient thermal solver are described. The temperature predictor, once implemented, can be used in a transient analysis for multi-ICs systems to enable IC and system designers to understand the transient thermal profile of each IC in the system. The Recurrent Neural Networks (RNN)-based temperature predictor can provide a fast computation of a transient Tmax for user specified locations on an IC for a given usage scenario and transient power profile.

This technique takes the benefit of an RNN model (or any sequence data model) to efficiently compute the transient response using the IC and system parameters, coarse transient IC temperature, and inherently stored history of the earlier temperature responses.

The RNN based temperature predictor can be applied to generate a fine grained on-IC transient thermal profile for large multi-IC systems. The structure of the proposed solution lends itself very easily to distributed computing, which can increase the efficiency of runtime and memory.

A method according to one embodiment described herein can include the following operations: generating a representation of two or more templates identifying different portions of an integrated circuit (IC), each template comprising a plurality of tiles, and each template associated with location parameters to identify a corresponding portion of the IC; performing a thermal simulation for each respective template of the IC based on a time based sequence of power patterns of tiles of the respective template, the sequence of power patterns separately applied during a sequence of time durations, the thermal simulation determining a sequence of temperatures for the respective template at an end of each of the time durations, each power pattern corresponding to a set of power levels to separately power the tiles of the respective template, each power level selected for the respective template from a set of predefined power levels, the sequence of the power patterns determined for the respective template based on a transient power profile for the IC; and training a neural network with a plurality of training data collected via thermal simulations performed for the templates of the IC.

In one embodiment, each of the two or more templates can be at a predetermined location on an integrated circuit (IC), each of the plurality of tiles can be powered in the thermal simulation at the power level, can be selected from the set of predefined power levels, to create the power pattern of the predefined power levels for each of the two or more templates.

In one embodiment, the method can further include generating a sequence of time-power tuples from the transient power profile for the IC to represent the power pattern of the predefined power levels for each of the two or more templates, each of the power pattern in the sequence of time-power tuples applied based on an order of the sequence of time-power tuples.

In one embodiment, the thermal simulation can be based on a set of a plurality of inputs including: (1) a predetermined location of the template, (2) a relationship between a change in temperature relative to a power applied to the IC in the thermal simulation, (3) and the sequence of time-power tuples. In one embodiment, the thermal simulation can determine a sequence of temperatures at the end of each time duration in the sequence of time-power tuples representing a plurality of transient temperatures at a center tile within the plurality of tiles for each of the two or more templates.

In one embodiment, the determined sequence of temperatures can generate a plurality of outputs associated with the set of a plurality of inputs to the thermal simulation.

In one embodiment, the training data can include the determined sequence of temperatures associated with each of the sequence of time-power tuples and the set of a plurality of inputs to the thermal simulation.

In one embodiment, the training of the neural network can include applying the set of a plurality of inputs that were applied to the thermal simulation and the sequence of time-power tuples for the sequence of temperatures to the neural network.

In one embodiment, the training can provide a trained temperature predictor.

In one embodiment, the two or more templates may include a template along an edge of the IC, a template near a center of the IC, and a template at a corner of the IC.

In one embodiment, the tiles located outside of each template can be powered with an average power level during the thermal simulation.

In one embodiment, the thermal simulation can be performed for each of the two or more templates separately. In one embodiment, the thermal simulation can include computational fluid dynamics simulations or finite element simulations.

In one embodiment, the neural network can be trained with the generated plurality of outputs and the set of a plurality of inputs from each of the thermal simulation.

In one embodiment, the relationship between a change in temperature relative to power can be Theta JA. In one embodiment, the neural network can be trained with a range of values of Theta-JA.

In one embodiment, the relationship between a change in temperature relative to power used in the thermal simulation can be varied across the thermal simulation.

In one embodiment, for a selected power pattern, a selected time period can be varied to generate a plurality of time-power tuples.

In one embodiment, the set of predefined power levels may include three or more power levels.

In one embodiment, the tiles of each template located outside a border of the IC can be powered with a zero power level during the thermal simulation.

In one embodiment, each template can be divided into a center tile group and a ring tile group.

In one embodiment, the tiles in the center tile group can be powered with three or more power levels and the tiles in the ring tile group can be powered with two power levels to reduce a number of the power pattern during the thermal simulation.

A method according to one embodiment described herein can include the following operations: retrieving from memory, a trained neural network model, the trained neural network model having been trained with a plurality of inputs and an output derived from a thermal simulation, the plurality of inputs comprising a plurality of inputs comprising a relationship between a change in a temperature relative to a power, the template predetermined location, and a sequence of time-power-temperature tuples; and determining, using the retrieved trained neural network model, a thermal behavior of a given tile on an integrated circuit (IC) for a selected time period having a location relative to the predetermined template location, a plurality of inputs to the retrieved trained neural network model including: (1) a selected relationship between a change in temperature relative to a power applied to the IC in the thermal simulation, (2) a selected predetermined location of the template, (3) a selected power pattern for the given tile and (4) a selected current uniform time-dependent temperature of the IC.

In one embodiment, the selected power pattern for the given tile can be determined based on a total power profile for the IC for the selected time period.

In one embodiment, for the selected time period, the given tile and a plurality of neighboring tiles create the selected power pattern.

In one embodiment, for the selected time period, the total power profile for the IC can be distributed to each tile on the IC.

In one embodiment, the retrieved trained neural network model can determine the predetermined template based on the location of the given tile relative to the predetermined template location.

In one embodiment, the method according to one embodiment described herein can include the following operations: updating the selected current uniform time-dependent temperature of the IC based on a predetermined threshold.

In one embodiment, the updated selected current uniform time-dependent temperature of the IC may include a midpoint temperature within the selected time period.

In one embodiment, determining the thermal behavior of the given tile on the IC may include determining a temperature at the end of the selected time period for the selected power pattern for the given tile.

In one embodiment, the method according to one embodiment described herein can include the following operations: updating an initial temperature of the given tile on the IC with the determined temperature at the end of selected time period for the selected power pattern for the given tile.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 2C shows an example of a template located near a center of an IC that can be used to generate training data according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can allow for a fast computation of transient maximum temperature, Tmax for a user specified locations on an integrated circuit (IC) for a given usage scenario and a transient power profile. Hence, this approach can expedite the on-IC thermal solution in an IC/package or more complicated 3DIC designs including multiple ICs. The method described herein provides a fast thermal solution on IC-package-system to address various system usage scenarios and predict the transient behavior of the on IC temperature.

Figure 1A:
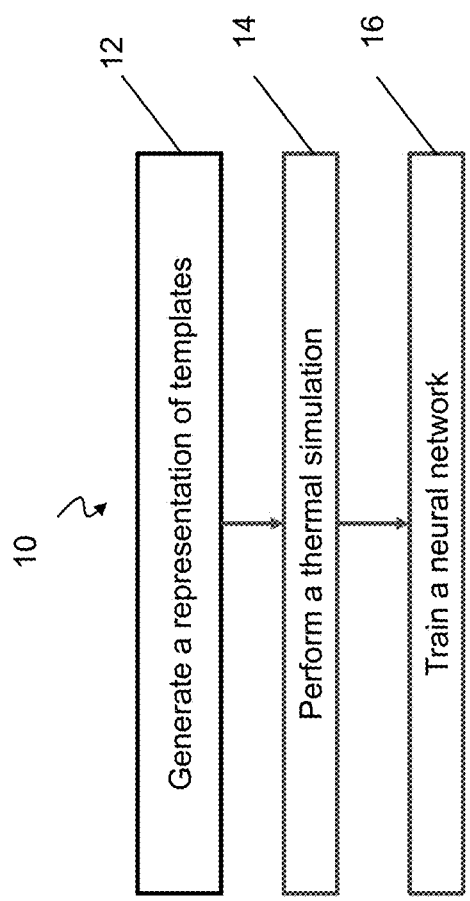
FIG. 1A is a flowchart which illustrates an overview method according to one embodiment which includes training data generation and training of the predictor according to one embodiment.

FIG. 1A shows an overview of a method 10 according to one embodiment. The method 10 can include preparing training dataset and training of a temperature predictor. In operation 12, a data processing system, such as the data processing system shown in FIGS. 13A-13B, can generate a representation of two or more templates identifying different portions of an IC.

In one embodiment, each template can include a plurality of tiles, and each template can be associated with location parameters to identify a corresponding portion of the IC.

Still referring to FIG. 1A, in operation 14, a thermal simulation for each respective template of the IC based on a time based sequence of power patterns of tiles of the respective template can be performed. In one embodiment, the sequence of power patterns can be separately applied during a sequence of time durations. In one embodiment the thermal simulation can determine a sequence of temperatures for the respective template at an end of each of the time durations. In one embodiment, each power pattern can correspond to a set of power levels to separately power the tiles of the respective template. In one embodiment, each power level can be selected for the respective template from a set of predefined power levels. In one embodiment, the sequence of the power patterns can be determined for the respective template based on a transient power profile for the IC.

In one embodiment, in operation 16 of method 10 as illustrated in FIG. 1A, a neural network can be trained with a plurality of training data collected via thermal simulations performed for the templates of the IC.

Figure 1B:
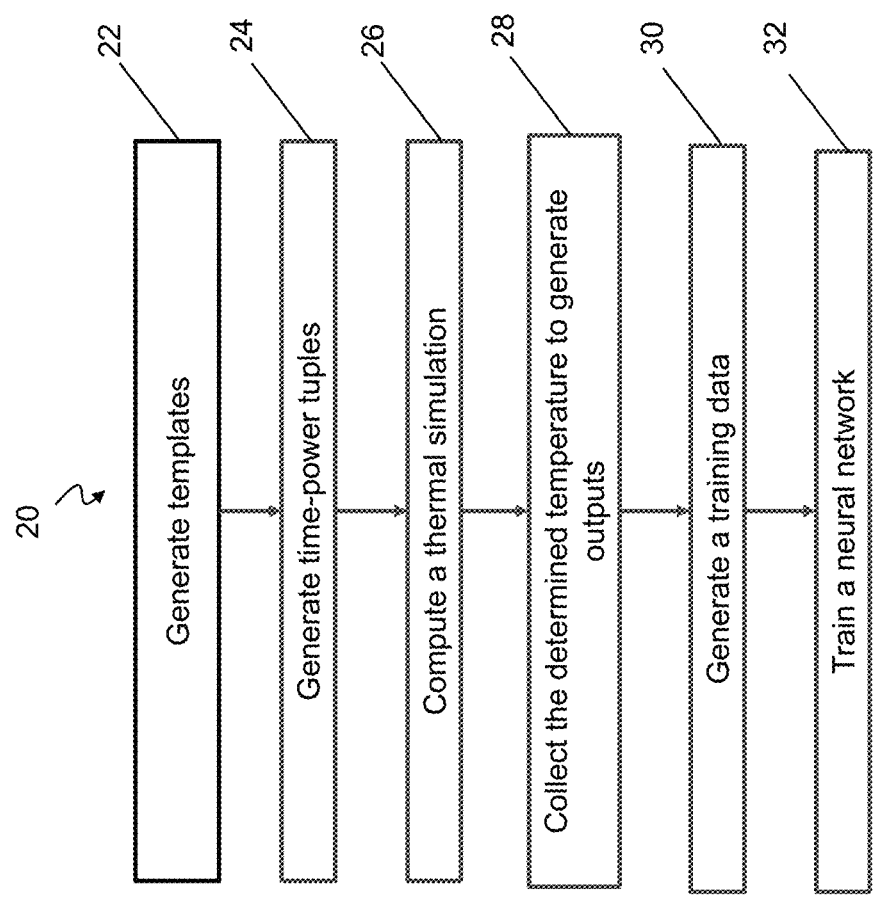
FIG. 1B is a flowchart which illustrates an overview method which includes training data generation and training of the predictor according to one embodiment.

FIG. 1B shows an example of method which includes preparing training dataset and training of a temperature predictor. FIG. 1B represents an overview of a method 20 according to one embodiment. In operation 22, a data processing system, such as the data processing system shown in FIGS. 13A-13B, can generate a representation of two or more templates. Each of the two or more templates can include a plurality of tiles, each at a predetermined location on an integrated circuit. Each of the two or more templates can be at a predetermined location on an IC. Each of the plurality of tiles to be powered in a simulation at a predefined power level, selected from a set of predefined power levels, to create a pattern of the predefined power levels for each of the two or more templates. In operation 24, a sequence of time-power tuples of arbitrary length, from the transient power profile for the IC can be generated to represent the power pattern of the predefined power levels for each of the two or more templates. For example, a first time-power tuple of the pair of time-power tuples can have a first power pattern being applied for a first time period. A second time-power tuple of the pair of time-power tuples can have a second power pattern being applied for a second time period and so on. In one embodiment, each of the power pattern in the sequence of time-power tuples can be applied based on an order of the sequence of time-power tuples. In operation 26, a thermal simulation can be computed for each of the two or more templates based on a set of a plurality of inputs including: (1) a predetermined location of the template, (2) a relationship between a change in temperature relative to a power applied to the IC in the simulation, (3) and the sequence of time-power tuples.

In some embodiments, a plurality of inputs can be used in a thermal simulation to generate training dataset. The training dataset can be used to train the neural network model. The plurality of inputs can include: three templates having a template location on the IC (within-the-IC, border, corner); Dx1 and Dy1 (for within-the-IC template); Dy2 (for border template); sequence of time-power tuples for each tile of N×N template having a tile size of K(μm)×K(μm); the rest of the IC area having average power, Pave with several levels; the outside-the-IC tile have power density of zero for border and corner templates; 3-5 levels of Theta-JA; 3-5 values of approximate on-IC uniform temperature; 3-5 values of thermal time constants of typical systems; and metal densities of IC interconnect layers. The three templates having N×N tiles can be used to reduce input enumeration.

In one embodiment, the training of neural network can be performed by using sequences of varying lengths of the time-power-temperature tuples $(T_{init}, \text{tau}, 0, t_1, [P_1], T_1)$, $(T_{init}, \text{tau}, t_1, t_2, [P_2], T_2), \ldots, (T_{init}, \text{tau}, t_{n-1}, t_n, [P_n], T_n)$, where $[P_1]$ is the power density pattern between 0 and $t_1$ and $[P_2]$ is the power density pattern between $t_1$ and $t_2$. $T_1$ is the temperature at the end of $t_1$, $T_2$ is the temperature at the end of time $t_2$, and $T_n$ is the temperature at the end of time $T_n$. $T_{init}$ is the initial temperature at the beginning of this sequence, tau is the thermal time constant of the IC-package-system. In one embodiment, m training sequences $n_1, n_2, n_3, \ldots n_m$ of varying lengths can be generated. $(T_{init}, \text{tau}, t_{n-1}, t_n, [P_n])$ can refer to time-power tuples and $(T_{init}, \text{tau}, t_{n-1}, t_n, [P_n], T_n)$ can refer to time-power-temperature tuples because the tile temperature $T_n$ has been added to the time-power tuple.

In one embodiment, boundary conditions can be inputted to the thermal simulation. Boundary conditions can include junction temperature. Other inputs can include metal densities of IC interconnect layers, IC size, substrate thickness, metal density, and package design parameters.

In one embodiment, the output of the thermal simulation can include a transient temperature for the center tile for each template. In one embodiment, the ground truth can be the transient temperature at the center of the tile at the end of $t_1, t_2, t_3, \ldots, t_n$ for within-the-die template, one-sided border template, and corner template with the training dataset generated via a thermal simulation.

In some embodiments, the transient temperature at any tile on the IC depends on the power densities for the current power profile, the initial temperature of the tile and system, and material properties.

In one embodiment, the thermal simulation can determine a sequence of temperatures at the end of each time duration in the sequence of time-power tuples representing a plurality of transient temperatures at a center tile within the plurality of tiles for each of the two or more templates. In operation 28, the determined sequence of temperatures can be collected to generate a plurality of outputs associated with the set of a plurality of inputs to the thermal simulation. In operation 30, training data including the determined sequence of temperatures associated with each of the pair of power-tuples and the set of a plurality of inputs to the thermal simulation can be generated.

In one embodiment, the first tile can include the center tile.

In one embodiment, the training data can include the determined sequence of temperatures associated with sequence of time-power tuples and the set of other inputs to the thermal simulation.

In operation 32, a neural network can be trained using the generated trained data by applying the plurality of inputs that were applied to the thermal simulation and the sequence of time-power tuples for a corresponding sequence of temperatures. The sequence of temperatures can serve as the labels for the training data. In one embodiment, the neural network can be a recurrent neural network (RNN). Alternatively, any function or sequence based architecture capable of handling sequence data or time series such as GRU or LSTM can be used can be used to train the temperature predictor.

In one embodiment, the training can provide a trained temperature predictor.

In one embodiment, the two or more templates can include a template along an edge of the IC and a template near a center of the IC. In another embodiment, the two or more templates can include three templates on the IC. The two or more templates can include a template at a corner of the IC.

Figure 2A:
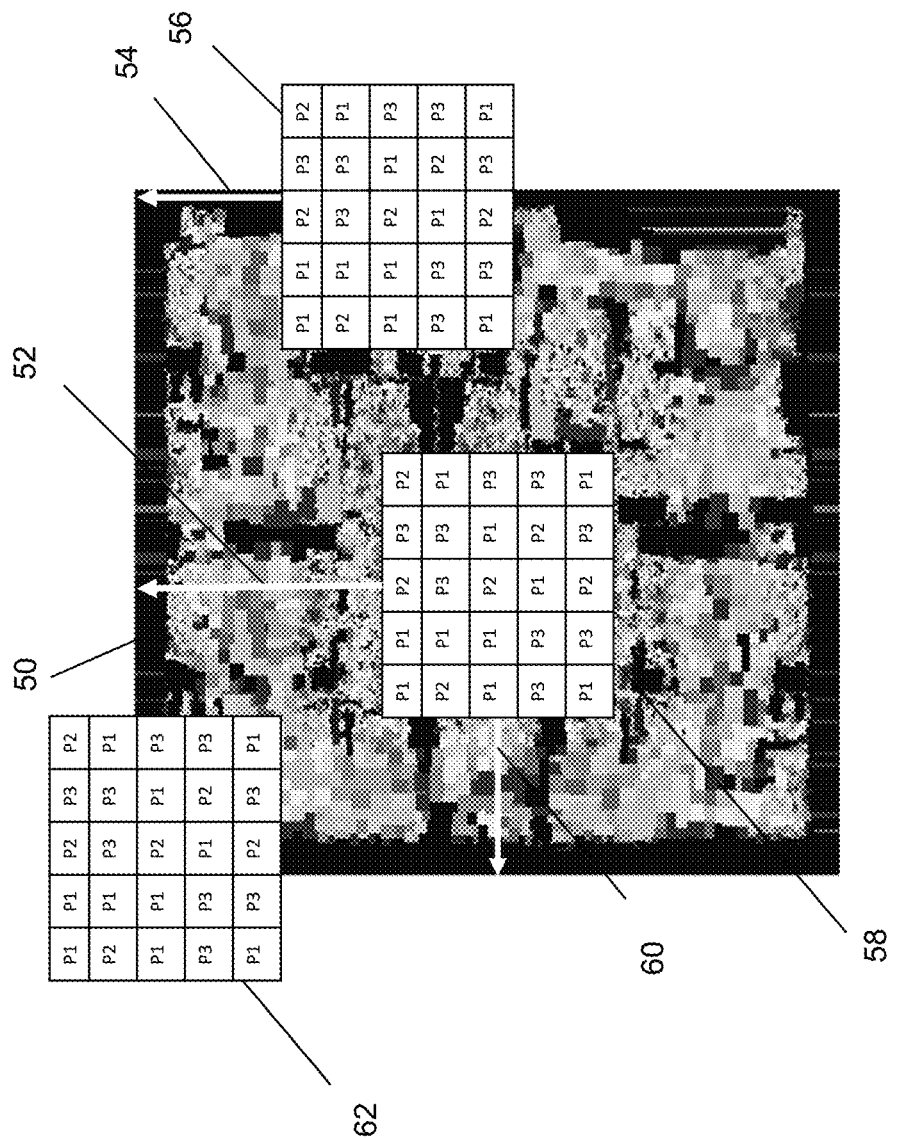
FIG. 2A shows an example of three templates used to generate training data according to one embodiment.

In one embodiment, for example, the template located within-the-IC can include Dx1 60 and Dy1 52 as a coordinate on the IC as illustrated in FIG. 2A. Dx1 60 and Dy1 52 can be measured from the center tile of the within-the-IC template 58. The template located at any of the four corners of the IC can be considered as a corner template 62. As further illustrated in FIG. 2A, the template 56 located at a border of the IC 50 can include Dy2 54 as a coordinate on the IC 50. Dy2 54 can be measured from the center tile of the border template 56.

Still referring to FIG. 2A, each tile on a template can have a power value selected from a range of power values consistent with a real IC case. For example, in one embodiment as shown in FIG. 2A, each tile on a template can be assigned with a power value selected from three levels of power P1, P2, and P3 to account for a temperature dependency. The three levels of power P1, P2, and P3 can be temperature dependent. The power value on each tile can be determined based on the practical device power levels at low, medium, and high level consistent to the technology node of the IC. For example, the power value on the IC can be 1 milliWatt to represent the low level P1, 5 milliWatt to represent medium level P2, and 10 milliWatt to represent high level P3.

A combination of three levels of power P1, P2, and P3 can create a pattern of the predefined power level for each of the two or more templates. In one embodiment, the power level on the 5 by 5 tiles template as shown in FIG. 2A can be based on a practical device power levels at low, medium, and high level consistent to the technology node of the IC. As illustrated in FIG. 2A, for a template having 5 by 5 tiles, the possible number of power pattern combinations generated from three levels of power P1, P2, and P3 can be $3^{25}$ that equals to 847,288,609,443.

In one embodiment, the tiles located outside of each template can be powered with an average power level during the thermal simulation.

Figure 2B:
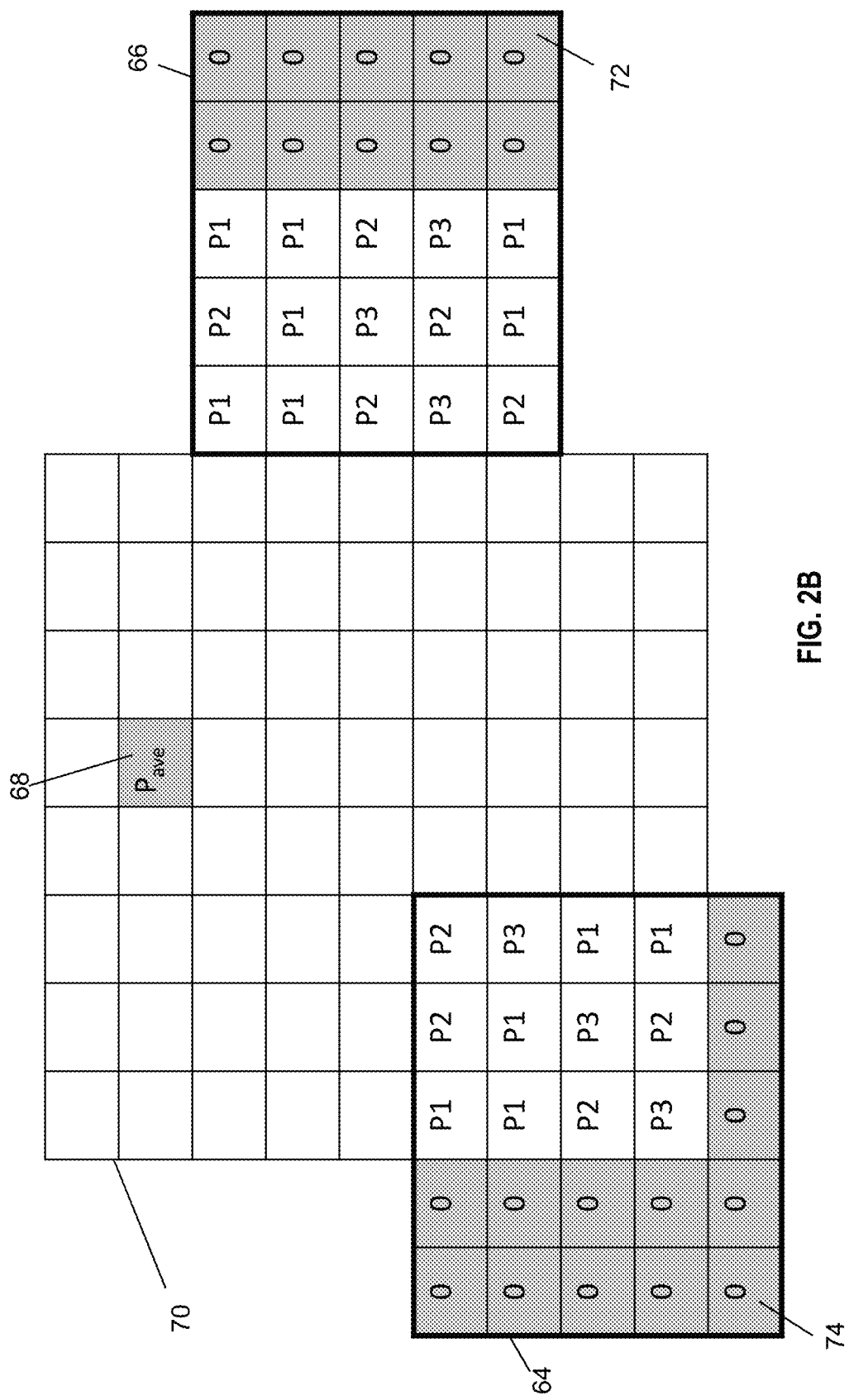
FIG. 2B shows an example of two templates used to generate training data according to one embodiment.

FIG. 2B shows an example of a corner template 64 and a border template 66. As shown in FIG. 2B, some of the tiles 74 (gray shaded) on the corner template 64 can be located outside of the edge of the IC 70 during a thermal simulation while preparing for the training dataset. Similarly, some of the tiles 72 (gray shaded) on the border template 66 can be located outside of the edge of the IC 70. These tiles 72, 74 can be assigned a zero power level during a thermal simulation. The tiles on each template located beyond a border of the IC can be powered with a zero power level during the thermal simulation. In one embodiment, the area of the rest of the IC not covered by the template can be assigned with an average power with several levels during the thermal simulation. For example, a given tile can be assigned an average, Pave 68 as shown in FIG. 2B.

Figure 2C:
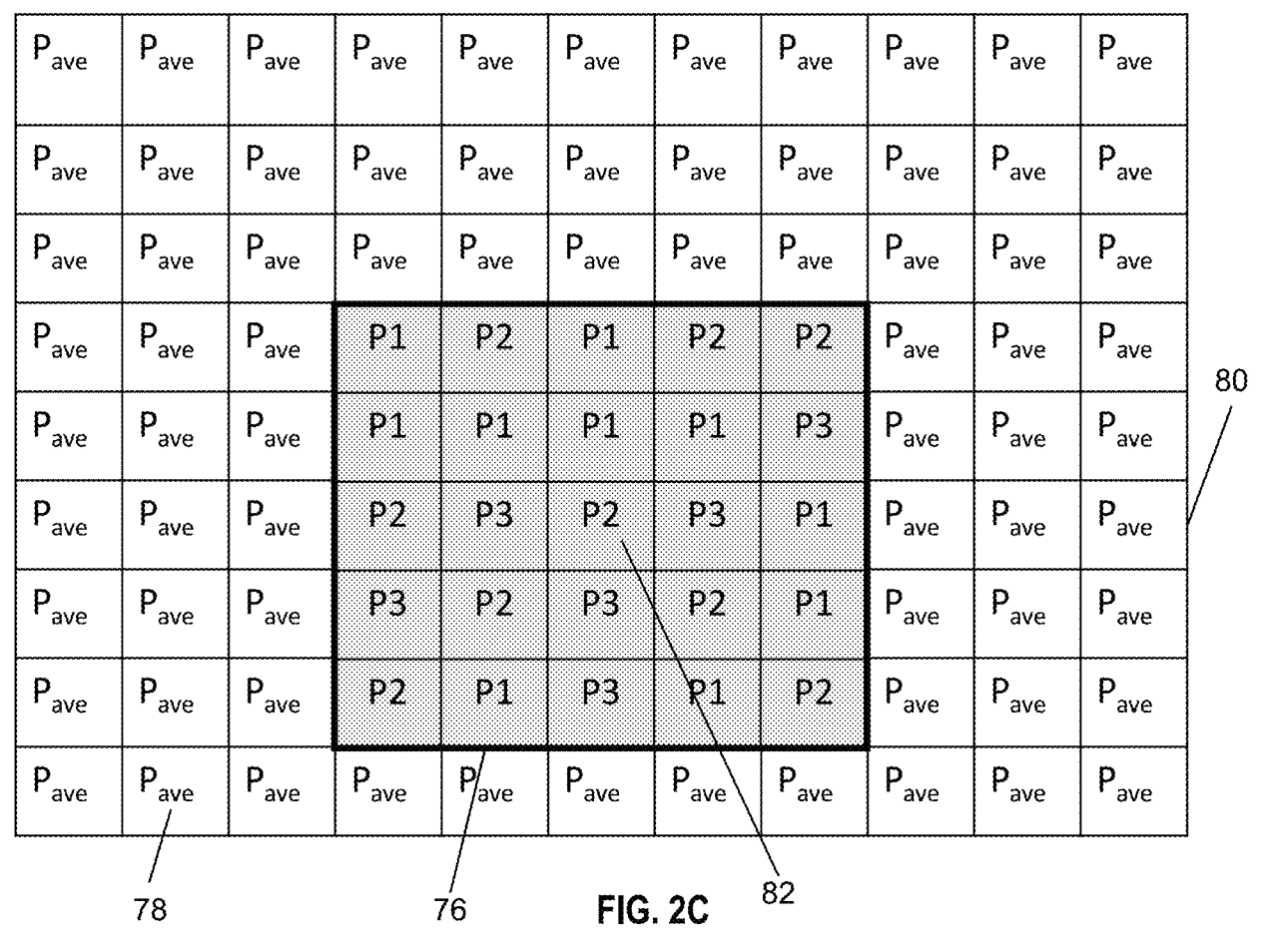

FIG. 2C shows an example of a template 76 (gray shaded) located near a center of an IC 80 having a center tile 82. In this embodiment, the tile not covered by the template on the IC can be assigned with an average power during the thermal simulation. FIG. 2C shows the average power, Pave 78 can be assigned to each tile which may not be covered by the template 76 during the thermal simulation.

In one embodiment, the thermal simulation can be performed for each of the two or more templates separately.

In one embodiment, the thermal simulation can be performed for each of the two or more templates separately. In one embodiment, the thermal simulation can include computational fluid dynamics simulations or finite element simulations.

In on embodiment, the predetermined location of a template can be determined based on a distance of a center tile on the template to a nearest boundary Dx, Dy of the IC and also the tile size, Ts on the template. For example, a function f(Dx, Dy, Ts) can be used to determine the predetermined location of the template matrix.

In one embodiment, function f(Dx, Dy, Ts) can determine the template can be near the center of the IC if Dx is less than 2.5 of the tile size, Ts and Dy is less than 2.5 of the tile size, Ts.

In another embodiment, function f(Dx, Dy, Ts) can determine the template can be at a corner of the IC if Dx equals or more than 2.5 of the tile size, Ts and Dy equals to or more than 2.5 times of the tile size, Ts.

In one embodiment, the neural network can be trained with the generated plurality of outputs and the set of inputs from each of the thermal simulation.

In one embodiment, a template can have N by N dimension. In one embodiment, N can include 5 and therefore, the total number of tiles on a template can include 25 as illustrated in FIGS. 2A-2D. In one embodiment, each tile on the template can have a size of K(μm) by K(μm). According to the present disclosure, K can be 10.

Figure 1C:
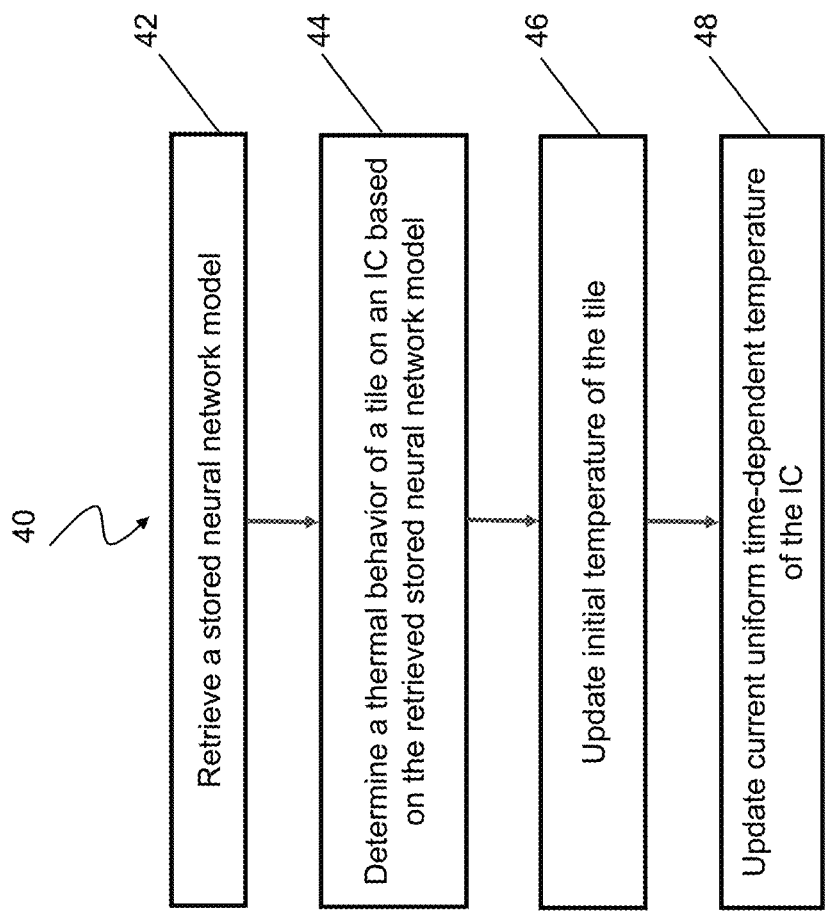
FIG. 1C shows the use of a trained predictor in a block diagram view according to one embodiment.

An example of the use of a trained temperature predictor is shown in FIG. 1C. In one embodiment, the trained temperature predictor can be retrieved from a memory. For example, in operation 42 of method 40, the trained neural network can be retrieved from a memory. The neural network model may have been trained with a plurality of inputs and an output derived from a thermal simulation. The plurality of inputs may include a plurality of inputs comprising a relationship between a change in a temperature relative to a power, the template predetermined location, and a pair of time-power-temperature tuples.

In operation 44, a thermal behavior of a given tile on an integrated circuit (IC) for a selected time period having a location relative to the predetermined template location can be determined using the retrieved trained neural network. A plurality of inputs can be inputted to the retrieved trained neural network model. The plurality of input may include: (1) a selected relationship between a change in temperature relative to a power applied to the IC in the thermal simulation, (2) a selected predetermined location of the template, (3) a selected power pattern for the given tile, and (4) a selected current uniform time-dependent temperature of the IC. In operation 46, an initial temperature of the given tile on the IC can be updated with the determined temperature at the end of selected time period for the selected power pattern for the given tile. In operation 48, the selected current uniform time-dependent temperature of the IC can be updated based on a predetermined threshold.

In one embodiment, the determining the thermal behavior of the given tile on the IC can include determining a temperature at the end of the selected time period for the selected power pattern for the given tile.

In one embodiment, the updated selected current uniform time-dependent temperature of the IC can include a midpoint temperature within the selected time period.

In one embodiment, the selected power pattern for the given tile can be determined based on a total power profile for the IC for the selected time period.

In one embodiment, for the selected time period, the total power profile for the IC can be distributed to each tile on the IC.

Figure 2D:
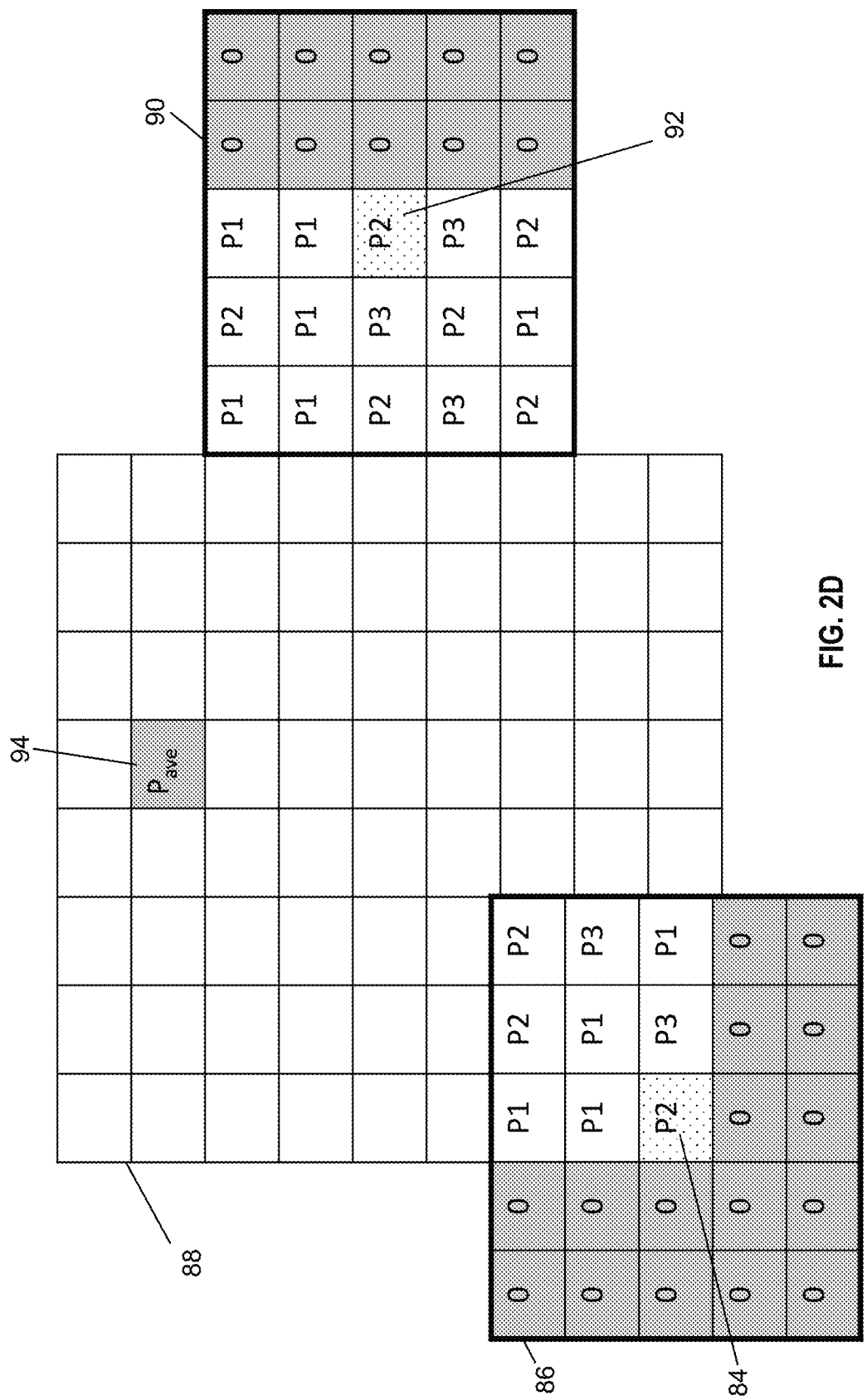
FIG. 2D shows an example of a power pattern determined for a given tile used to predict a temperature for the given tile using the trained temperature predictor according to one embodiment.

In another embodiment, for example as shown in FIG. 2D, for the selected time period, the given tile 84 on an IC 88 and a plurality of neighboring tiles can create the selected power pattern 86. Each tile can consume a different amount of power for a selected time period. For example, when a user is watching a video on a mobile phone for a selected time period, a power of one Watt can be unevenly distributed across the tiles on the IC. In this example, the given tile 84 can be located at a corner of an IC 88. The tiles located outside of the IC 88 can be assigned zero power level. The remaining of the tiles on the IC can be powered at average power, Pave 94.

In another embodiment, the given tile 92 on an IC 88 and a plurality of neighboring tiles can create the selected power pattern 90. In this example, the given tile 92 can be located along an edge of an IC 88.

In one embodiment, the retrieved trained neural network model can determine the predetermined template based on the location of the given tile relative to the predetermined template location. For example, the given tile 84 can be located at a corner of the IC 88. The trained temperature predictor can use the predetermined corner template (template 62 in FIG. 2A) when determining the temperature of the given tile because of the relative location of the given tile 84 on the IC 88 to the predetermined template location. Similarly, the trained temperature predictor can use the predetermined template along the border of the IC (template 56 in FIG. 2A) when determining the temperature of the given tile because of the relative location of the given tile 92 on the IC 88 to the predetermined template location.

In one embodiment, the relationship between a change in temperature relative to power can be Theta JA. In one embodiment, the neural network can be trained with a range of values of Theta-JA.

In another embodiment, the relationship between a change in temperature relative to power used in the thermal simulation can be varied across the thermal simulation.

In another embodiment, for a selected power pattern, a selected time period can be varied to generate a plurality of time-power tuples.

In one embodiment, the set of predefined power levels may include three or more power levels.

In one embodiment the tiles of each template located outside a border of the IC can be powered with a zero power level during the thermal simulation.

In one embodiment, each of the two or more templates may be divided into a center tile group and a ring tile group.

In one embodiment, the plurality of tiles in the center tile group may be powered with three or more power levels and the plurality of tiles in the ring tile group can be powered with two power levels to reduce a number of the power pattern during the thermal simulation.

Figure 3:
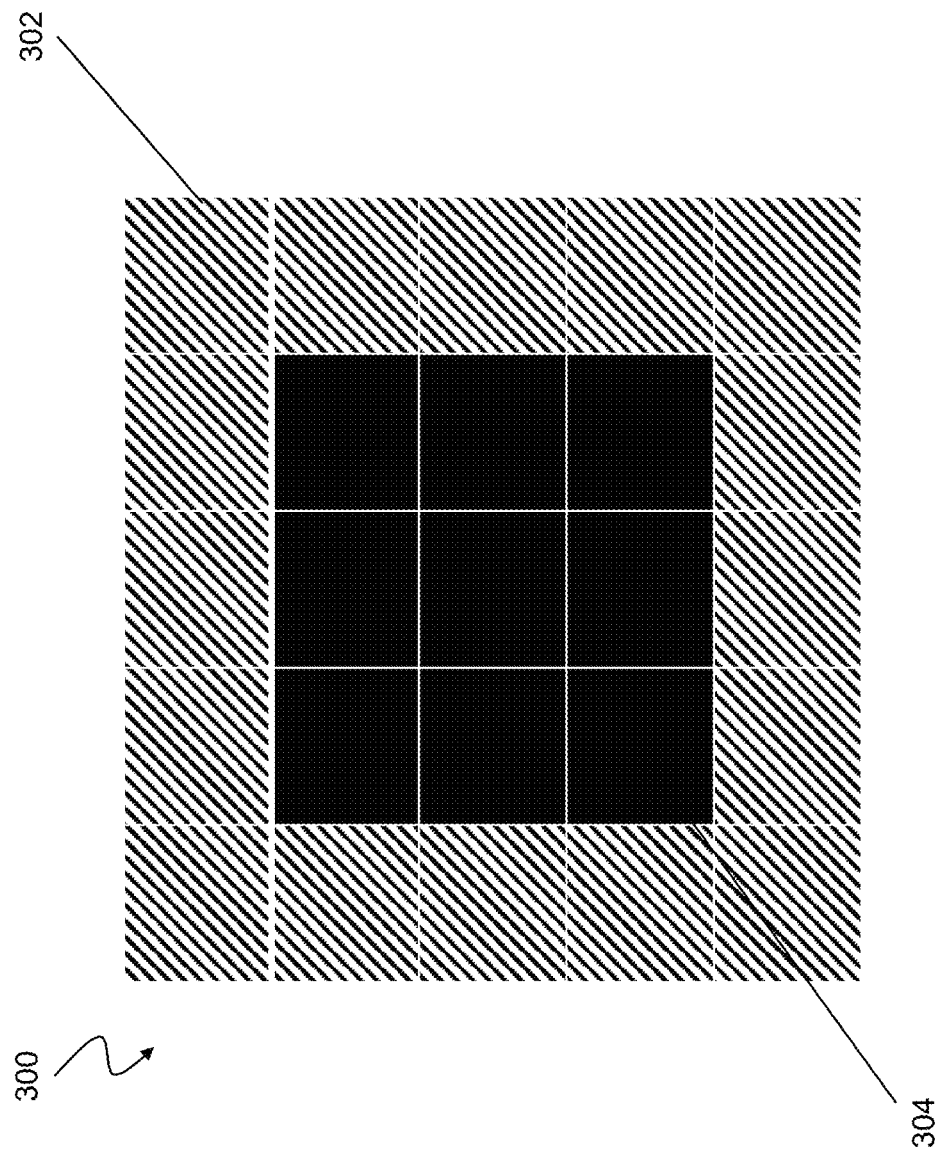
FIG. 3 shows an example of power-on-tile patterns Design of Experiment (DOE) that can be used to reduce input training cases for a template according to one embodiment.

According to an embodiment, proper schemes can be developed to reduce the possible number of power combinations to be solved. In one embodiment, symmetry and DOE (Design of Experiment) technique can be used to reduce the number of power combinations. A parallel processing can accelerate the reduction of the possible number of power combinations. As illustrated in FIG. 3, for example, a 5 by 5 template 300 with 10 μm by 10 μm tile size can be divided into a center tile group 304 and a ring tile group 302. The center tile group 304 can include nine tiles and the ring tile group can include sixteen tiles. The ring tile group 302 can use a uniform two power levels to reduce a number of the power pattern during the thermal simulation. The center tile group 304 can have three levels of power density to reduce a number of the power pattern during the thermal simulation. In another embodiment, the input power patterns of all the twenty-five tiles case can be further reduced using symmetry in X and Y directions. The reduction of power-on-tile patterns can be applied to any of the templates 56, 58, 62 as shown in FIG. 2A.

Figure 4:
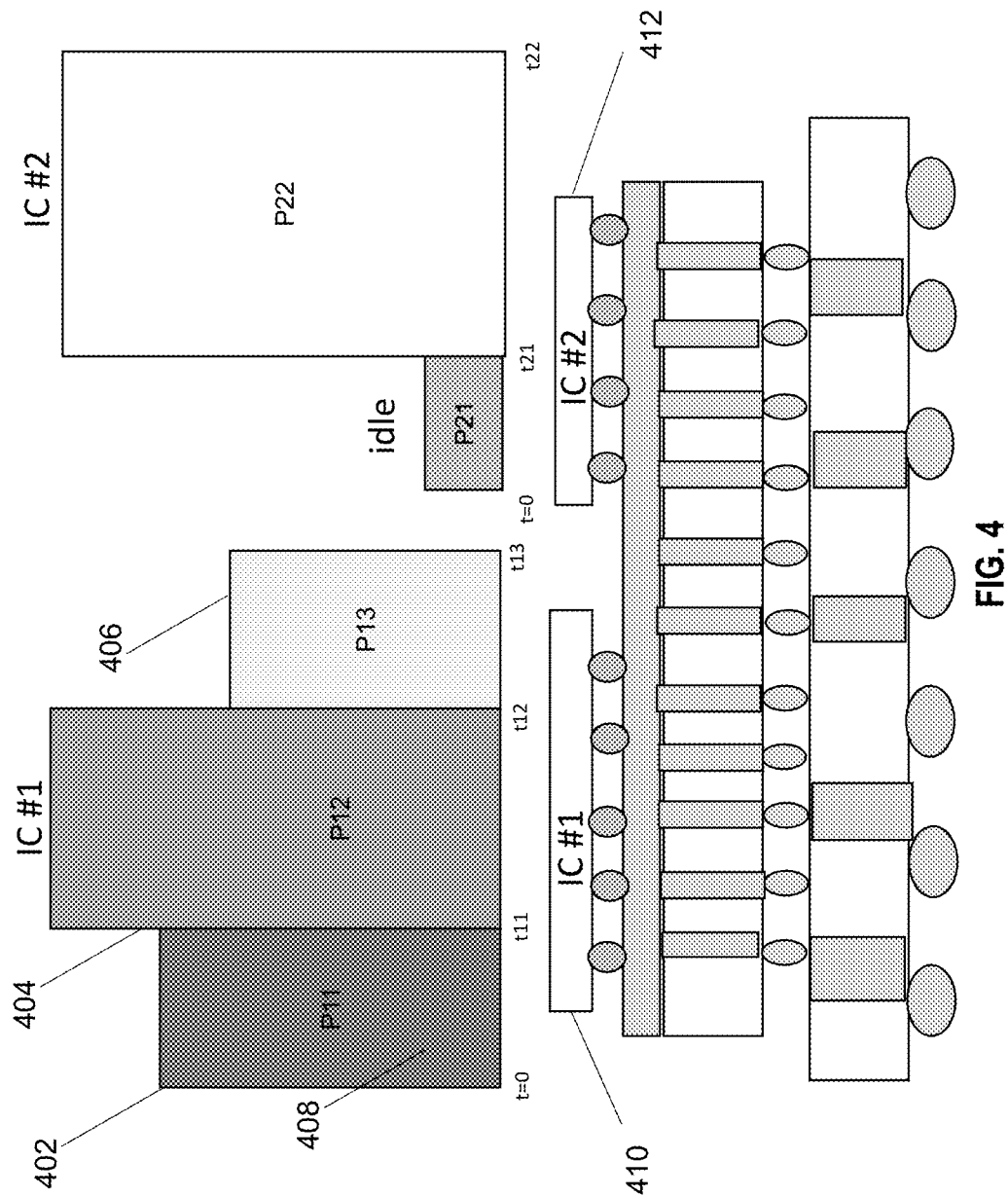
FIG. 4 shows a typical multi-IC package system and an example of how the transient power profile of the IC can arise from the different usage scenarios according to one embodiment.

FIG. 4 shows a typical multi-IC package system having ICs 410, 412 and an example of how the transient power profile of the IC can arise from the different usage scenarios. For example, in the case of a mobile phone, the usage scenarios can be calling 402, watching a video 404, or texting 406, or all these scenarios 403, 404, 406 concurrently. Each of these scenarios can have a specific average power such as average power 408. This specific average power can impact the temperature based on the time period of such scenario. For example, the average power 408 applied for a time period between t0 to t1 can lead to a change of a temperature in the scenario usage 402. A longer time period for a usage scenario can lead to a higher increase in a temperature.

Figure 5:
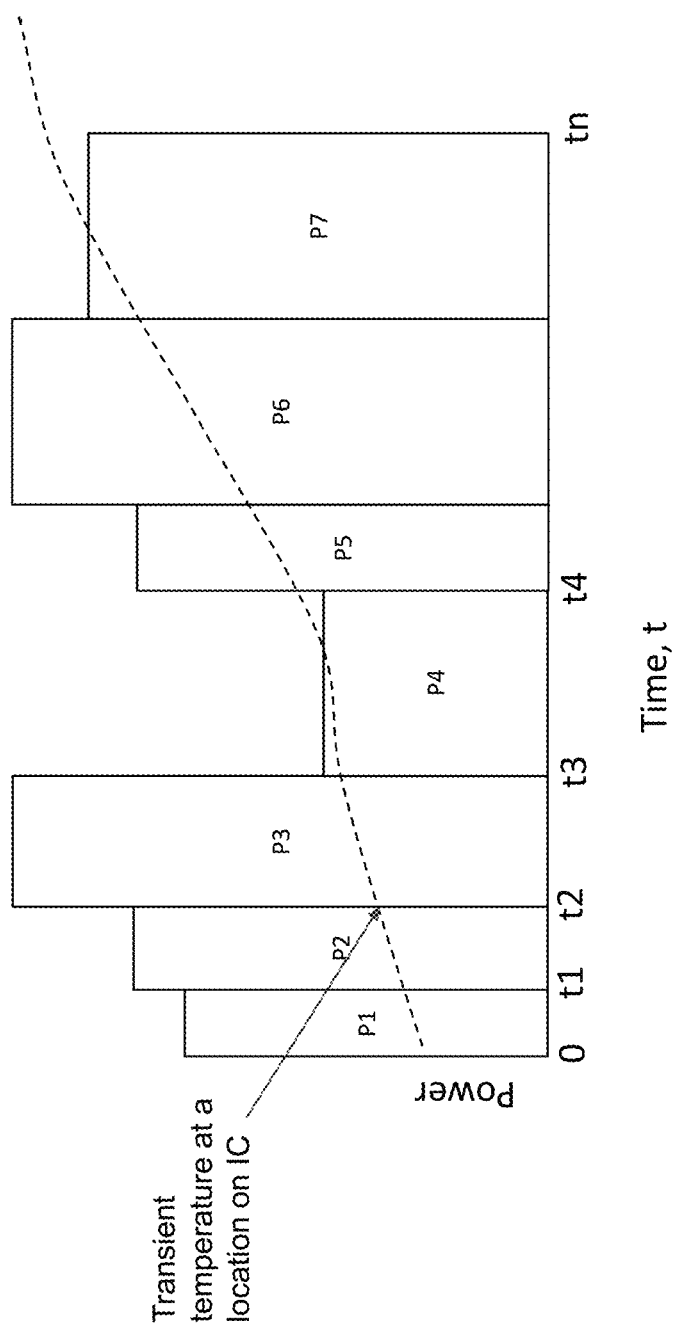
FIG. 5 shows an example of the transient temperature profile on an IC can be determined according to one embodiment.

Referring to FIG. 5, a temperature at the end of the period of the current power pattern depends on the current power pattern and also the previous temperature. For example, the temperature at the end power pattern P4 which is at t4 can depend on the temperature when P4 being applied between t3 and t4 and also the temperature at the end of P3 after P3 power pattern being applied between t2 and t3.

Figure 6:
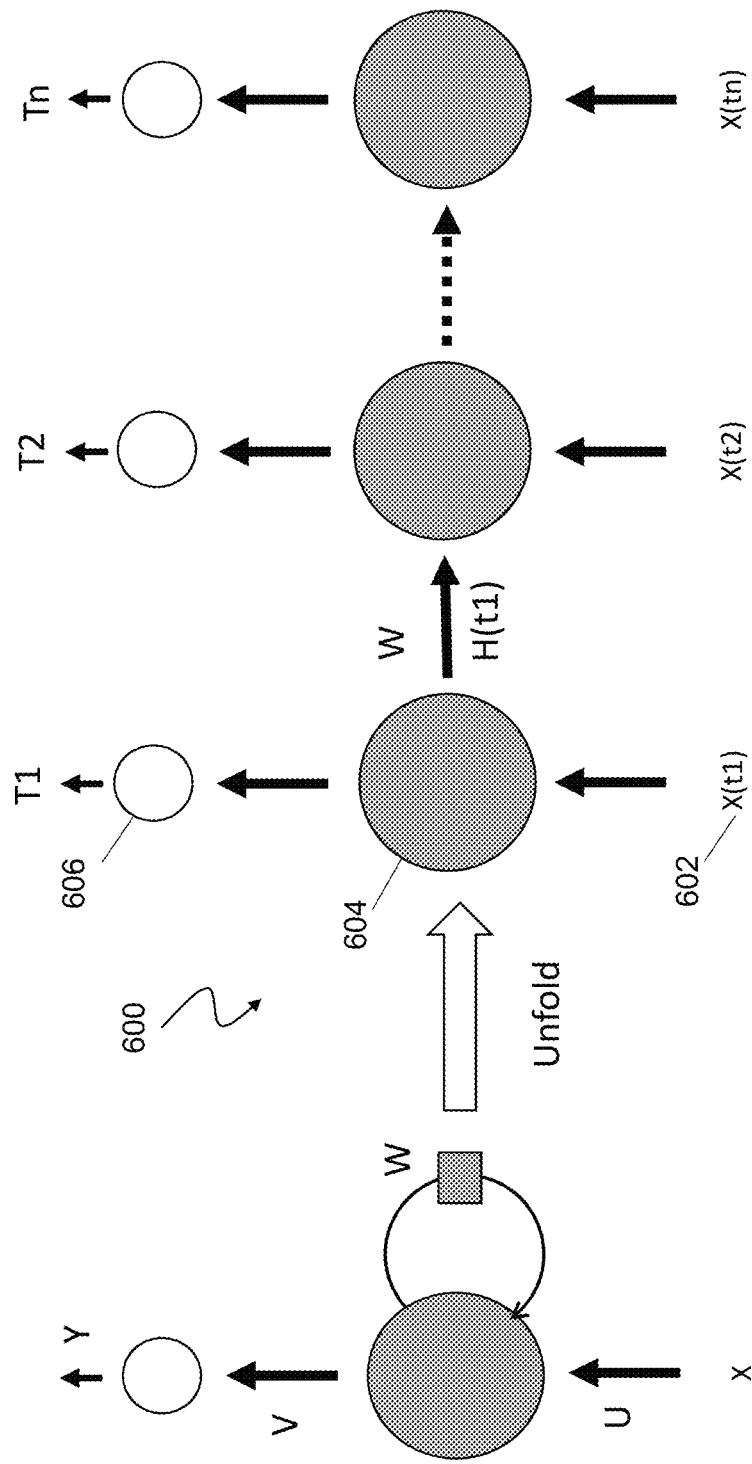
FIG. 6 shows an example of a Recurrent Neural Network (RNN) which can be used in one embodiment for a trained predictor according to one embodiment.

FIG. 6 illustrates an example of a RNN 600 which can include successive layers, an input layer 602, a hidden layer 604, and an output layer 606. These hidden layers can be trained using techniques known in the art in which inputs received from data processing are applied as inputs to the input layer 602 while also applying outputs which are expected outputs (for a given input) to the output layer which is output layer 606.

In one embodiment, the neural network such as shown in FIG. 6 can be trained using a sequence of time-power-temperature tuples such as ($T_{init}$, tau, 0, t1, [P1], T1), ($T_{init}$, tau, t1, t2, [P2], T2) . . . . For example, the time period 0 to t1 and t1 to t2 can be selected from a range of numbers, and [P1] can be a power pattern between a time period of 0 to t1 and [P2] can be a power pattern between a time period between t1 and t2. The power pattern [P1] can be applied for t1 period and the next power pattern [P2] can be applied between the times t1 and t2. The time period of each time power tuple can be varied. For example, for a selected time period, all combinations of possible power patterns can be applied to generate a plurality of ground truth data to determine the temperature at the end of the selected period using a thermal simulation such as CFD or FEM simulation.

In one embodiment, power patterns [P1] and [P2] can be created based on a combination of power levels P1, P2, and P3 being assigned on each tile on a matrix having a dimension of a predetermined template. For example, for a predetermined template of a size 5 by 5 tiles can have a power pattern with a dimension of 5 by 5. The temperature, Temp1 at the end of t1 period and temperature, Temp2 at the end of t2 period and so on can be determined using a thermal simulation such as CFD or FEM simulation to generate a training dataset. Temperature, Temp1, Temperature, Temp2 and so on can be collected. The generated training dataset can include a pair of time-power tuples with the associated determined temperatures such as ([P1], [P2], . . . t1, Temp1), ([P1], [P2], . . . t2, Temp2), . . . ([P1], [P2], . . . tn, Tempn).

The time-power-temperature tuples ($T_{init}$, tau, [P1], [P2], t1), ($T_{init}$, tau, [P1], [P2], t2) . . . for a given output (Temp1, Temp2, . . . ) can be applied to the RNN to determine a temperature which can be Temp1 and Temp2 and the corresponding input to derive a temperature predictor. The training data set can be augmented with the initial temperature, Tinit, and thermal time constant of the system, tau, to generate the training data as (Tinit, tau, [P1], [P2], t1, Temp1), (Tinit, tau, [P1], [P2], t2, Temp2) . . . .

In one embodiment, for a selected template, the power pattern can be represented by a sequence of time-power tuples (time-power tuple, A, time-power tuple, B, . . . ). To generate the sequence of time-power tuples, a transient power profile of an IC can be divided or distributed into a sequence of time-power tuples (time-power tuple, A, time-power tuple, B, . . . ). For each time-power tuple, a power pattern can be applied for a time period. For example, power pattern P1 can be applied between 0 to t1 and power level P2 can be applied between t1 to t2.

In one embodiment, for a given Theta-JA, a given template and a given power pattern, for example P1, the time period associated with the given power pattern [P1] can be varied to generate a new set of time-power tuples. As a result, for the given power pattern P1, a plurality of time-power tuples can be generated. Similarly, a plurality of time-power tuples can be generated for a power pattern [P2] by varying the time period.

In one embodiment, the training of neural network can be performed by using sequences of varying lengths of the time-power-temperature tuples ($T_{init}$, tau, 0, $t_1$, [$P_1$], $T_1$), ($T_{init}$, tau, $t_1$, $t_2$, [$P_2$], $T_2$), . . . , ($T_{init}$, tau, $t_{n-1}$, $t_n$, [$P_n$], $T_n$), where [$P_1$] is the power density pattern between 0 and $t_1$ and [$P_2$] is the power density pattern between $t_1$ and $t_2$. $T_1$ is the temperature at the end of $t_1$, $T_2$ is the temperature at the end of time $t_2$, and $T_n$ is the temperature at the end of time $T_n$. $T_{init}$ is the initial temperature at the beginning of this sequence, tau is the thermal time constant of the IC-package-system. In one embodiment, m training sequences $n_1$, $n_2$, $n_3$, . . . $n_m$ of varying lengths can be generated.

In one embodiment, the transient power profile for each IC can be divided into time-power tuples such as (0, t1, [P1]), (t1, t2, [P2]) such that power [P1] can be applied from time 0 to t1 and power [P2] from time t1 to t2. For a time period, the power consumption can be determined from the transient power profile.

After the time-power tuple has been determined, an appropriate power pattern can be selected. The temperature at the end of the time period for this time-power tuple can be determined using the RNN-based temperature predictor based on the determined transient temperature for the IC at the selected time period. As a result, a transient temperature curve and a transient Tmax at each tile on the IC can be generated.

Figure 7:
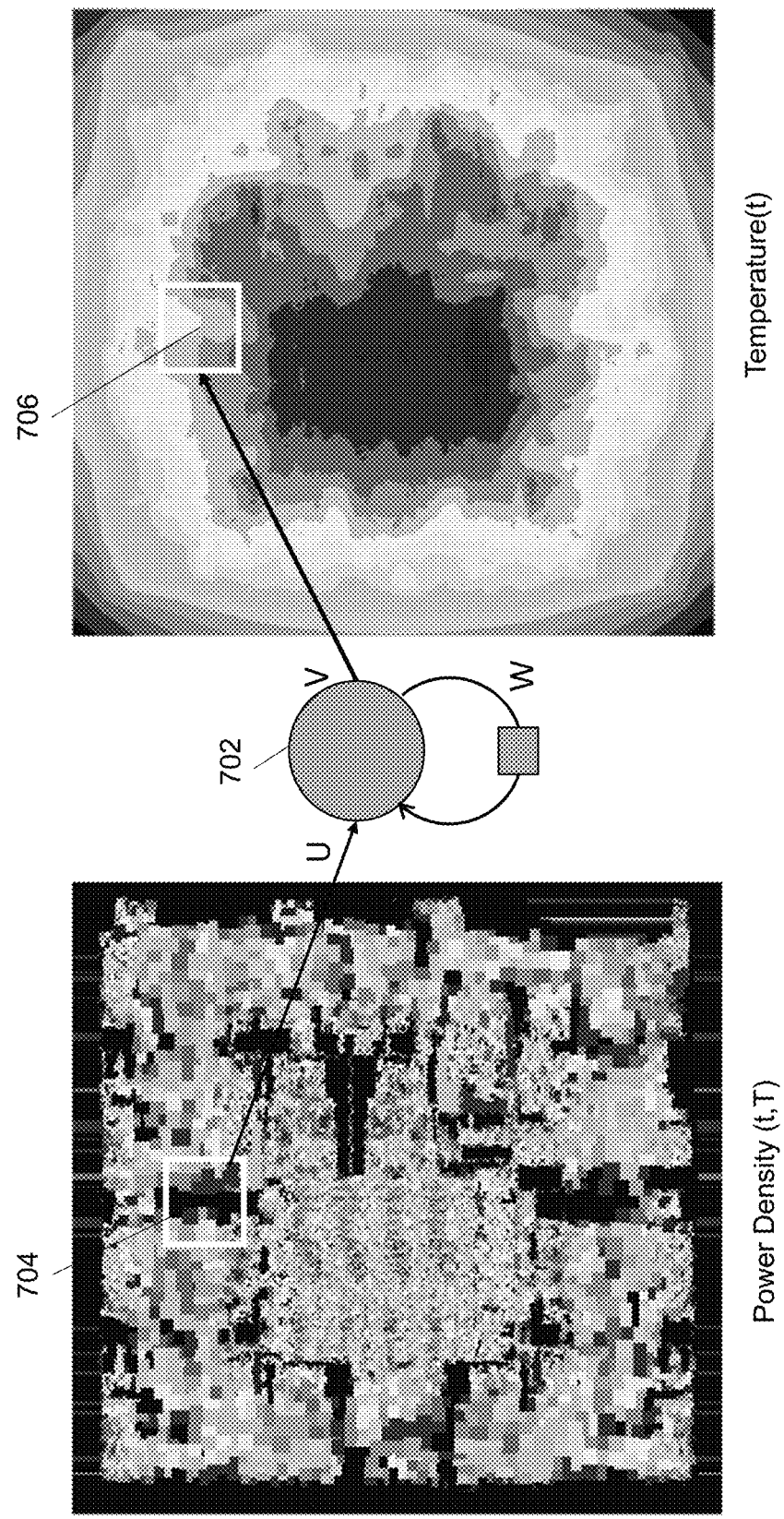
FIG. 7 shows an example of how the trained temperature predictor can be used to generate a fine temperature profile of a given IC based on a given transient power of the given IC profile according to one embodiment.

As illustrated in FIG. 7, for a selected time-power tuple having a time period, the RNN based temperature predictor 702 can be used to determine the temperature 706 at the end of the time period based on a selected power pattern.

Figure 8:
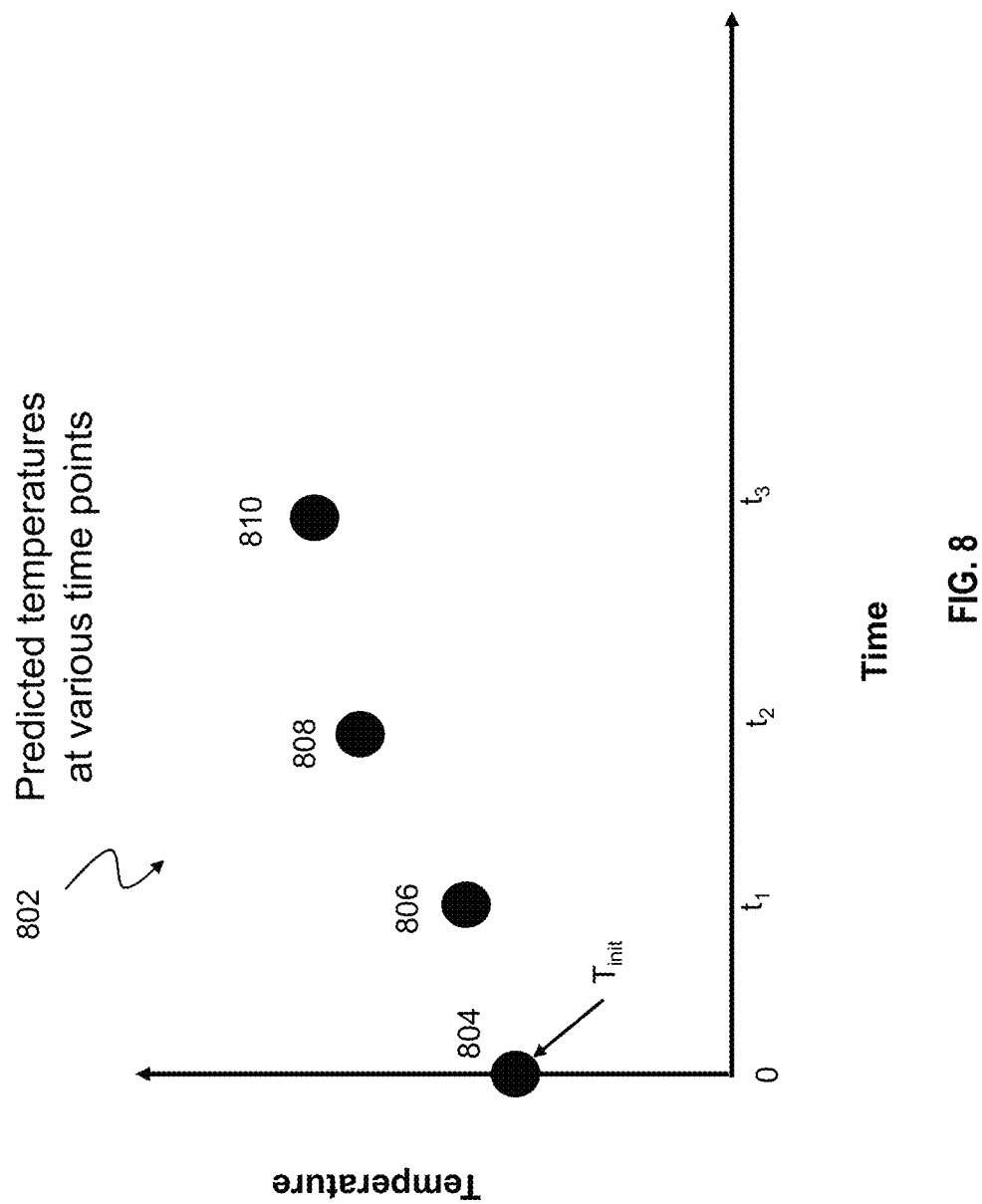
FIG. 8 illustrates an example how the trained temperature predictor can provide a time varying thermal profile for each time-power tuple for each tile according to one embodiment.

As shown in FIG. 8, the determined temperature from the temperature predictor can provide a time varying thermal profile 802 for each of the corresponding power-time tuple for each tile. The determined temperature at the end of the time period can update the initial temperature 804 for a given tile. The time varying thermal profile 802 can provide predicted temperatures 806, 808, 810 at corresponding time points t1, t2, t3 for each tile. With the varying thermal profile 802, a user can determine the temperature at a certain time for all the tiles. Similarly, a user can determine which part of the IC is getting hot due to the power consumption.

A time power tuple can be divided into smaller time periods to achieve a finer transient response. For example, a time power tuple (t1, t2, [P1]) can be divided into a pair of time power tuples, (t1, t1', [P1]) t2, [P1]) such that t1<t1'<t2.

Figure 9A:
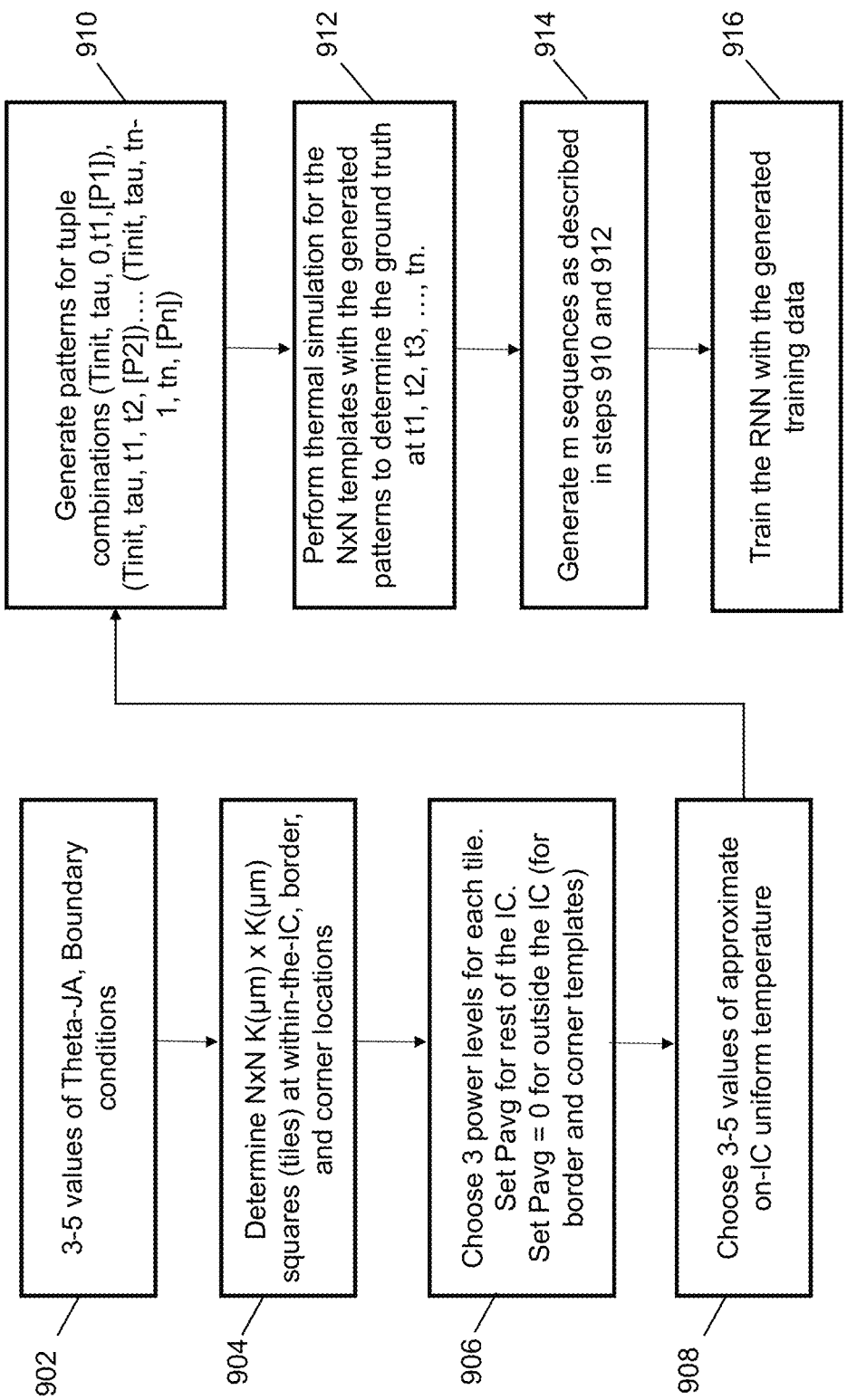
FIG. 9A is a flowchart which illustrates an overview method which includes training data generation and training of the predictor according to one embodiment.

In one embodiment, FIG. 9A shows a flowchart which illustrates an overview method according to one embodiment which includes training data generation and training of the predictor. The embodiment of the method can include step 902 configuring a number of Theta-JA values, for example, 3 to 5 values. The embodiment of step 902 can also include configuring the boundary conditions.

In some embodiments, the method can also include step 904 determining N×N K(μm)×K(μm) squares (tiles) template at within-the-IC, border, and corner locations.

In some embodiments, the method can also include step 906 selecting 3 power levels for each tile, assigning average power, Pave to the tiles in the area on the IC that may not be covered by the predetermined template (as shown in FIG. 2C), assigning Pave equals to zero to the tiles belonging to the border template or the corner template that are located outside of the IC border (as shown in FIG. 2D).

In one embodiment, the method can also include step 908 selecting a number of values to represent an approximate on-IC uniform temperature. The number of values to represent approximate on-IC uniform temperature can vary from 3 to 5.

In some embodiments, the method can further include step 910 generating patterns for tuple combinations (0, t1, [P1]), (t1, t2, [P2]), (t2, t3, [P3]) and so on in which [P1] can be a power pattern from 0 to t1, [P2] can be a power pattern between t1 and t2, [P3] can be a power pattern between t2 and t3 and so on.

In one embodiment, the method can further include step 912 performing thermal simulations for the N×N templates with the generated patterns to determine the ground truth.

In one embodiment, the method can also include step 914 generating me sequences as described in steps 910 and 912. The input to the simulation and the output of the simulations can be used to generate training data as ([P1], 0, t1, T1), ([P2], t1, t2, T2), ([P3], t2, t3, T3) and so on. T1, T2 are the output of the simulations.

In one embodiment, the method can further include step 916 training the neural network with the generated training data.

Figure 9B:
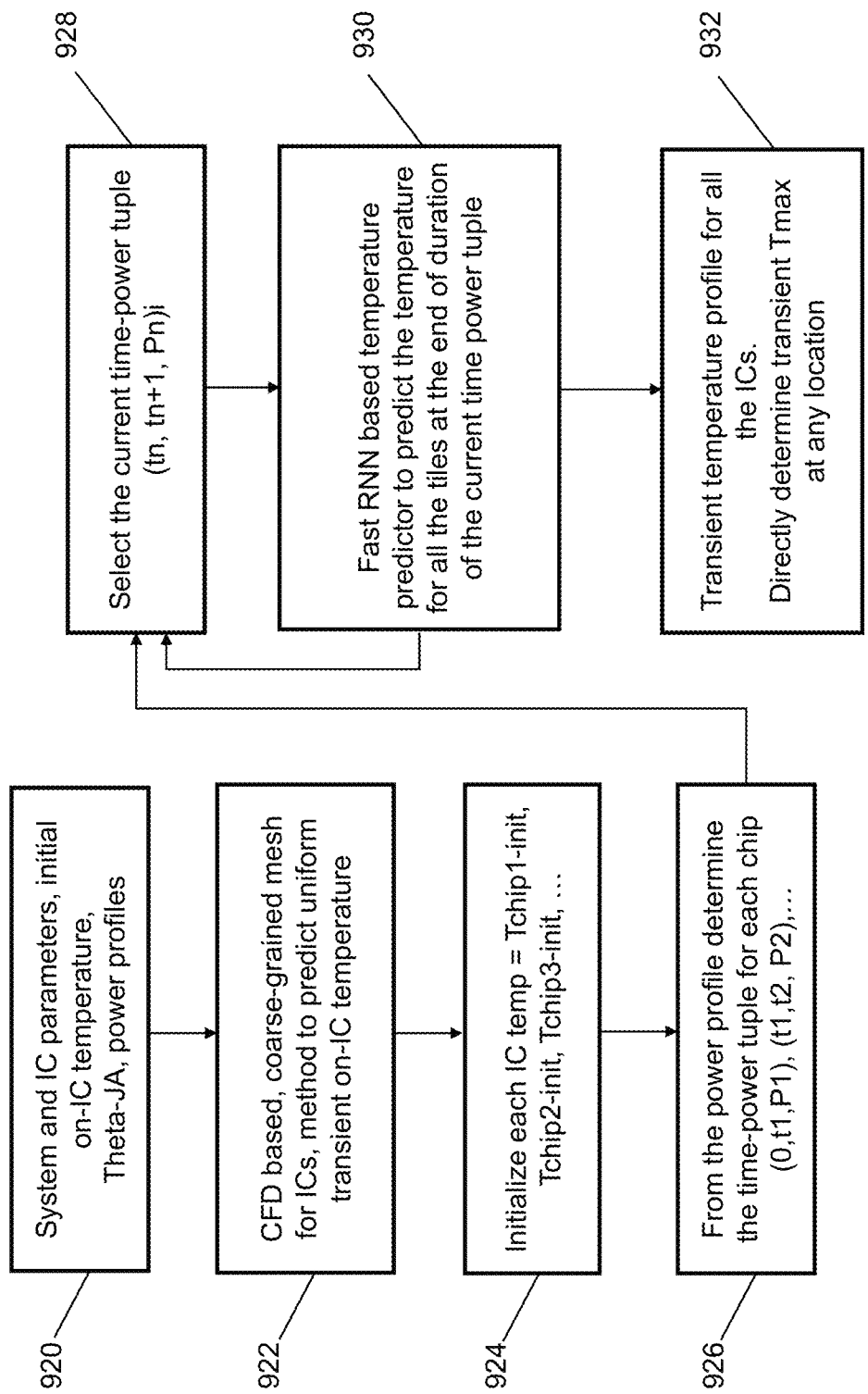
FIG. 9B is a flowchart which illustrates an overview method which includes predicting on-IC transient thermal behavior according to one embodiment.

In one embodiment, FIG. 9B shows a flowchart which illustrates an overview method according to one embodiment that can be used to predict on-IC transient thermal behavior. The embodiment of the method can include step 920 in which system and IC parameters, initial on-IC temperature, Theta-JA, power profiles can be set. The method can further include step 922 CFD based, coarse-grained mesh for ICs, method to predict uniform transient on-IC temperature. The method can further include step 924 in which each IC temperature can be initialized to be Tchip1-init, Tchip2-init, Tchip3-init.

In one embodiment, the method shown in FIG. 9B can also include step 926 determining the time-power tuple for each IC (0, t1, P1), (t1, t2, P2) . . . , based on the transient power profile. In step 928 of the method, the current time-power tuple (tn, tn+1, Pn)i can be selected. The method can further include step 930 in which fast RNN-based temperature predictor can be used to predict the temperature for all the tiles at the end of duration of the current time power tuple. The method can further include step 932 in which transient temperature profile for all the ICs can be generated. As a result, a user can directly determine transient Tmax at any location on the IC.

Figure 10A:
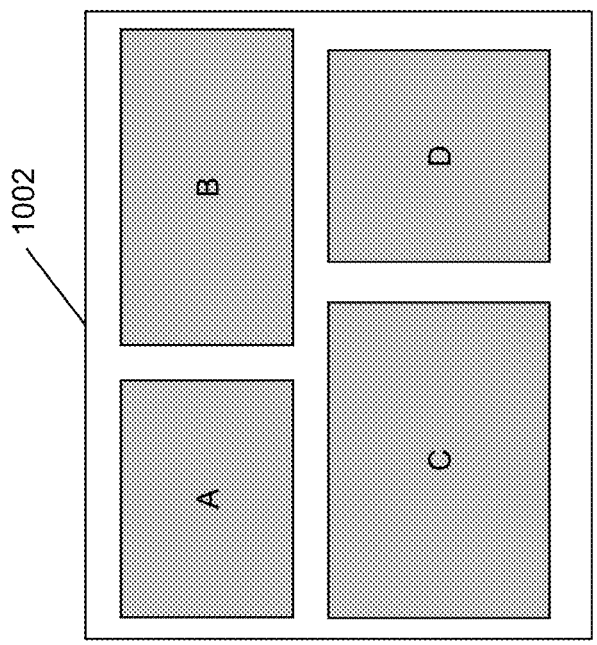
FIG. 10A shows an example of the blocks on an IC according to one embodiment.
Figure 10B:
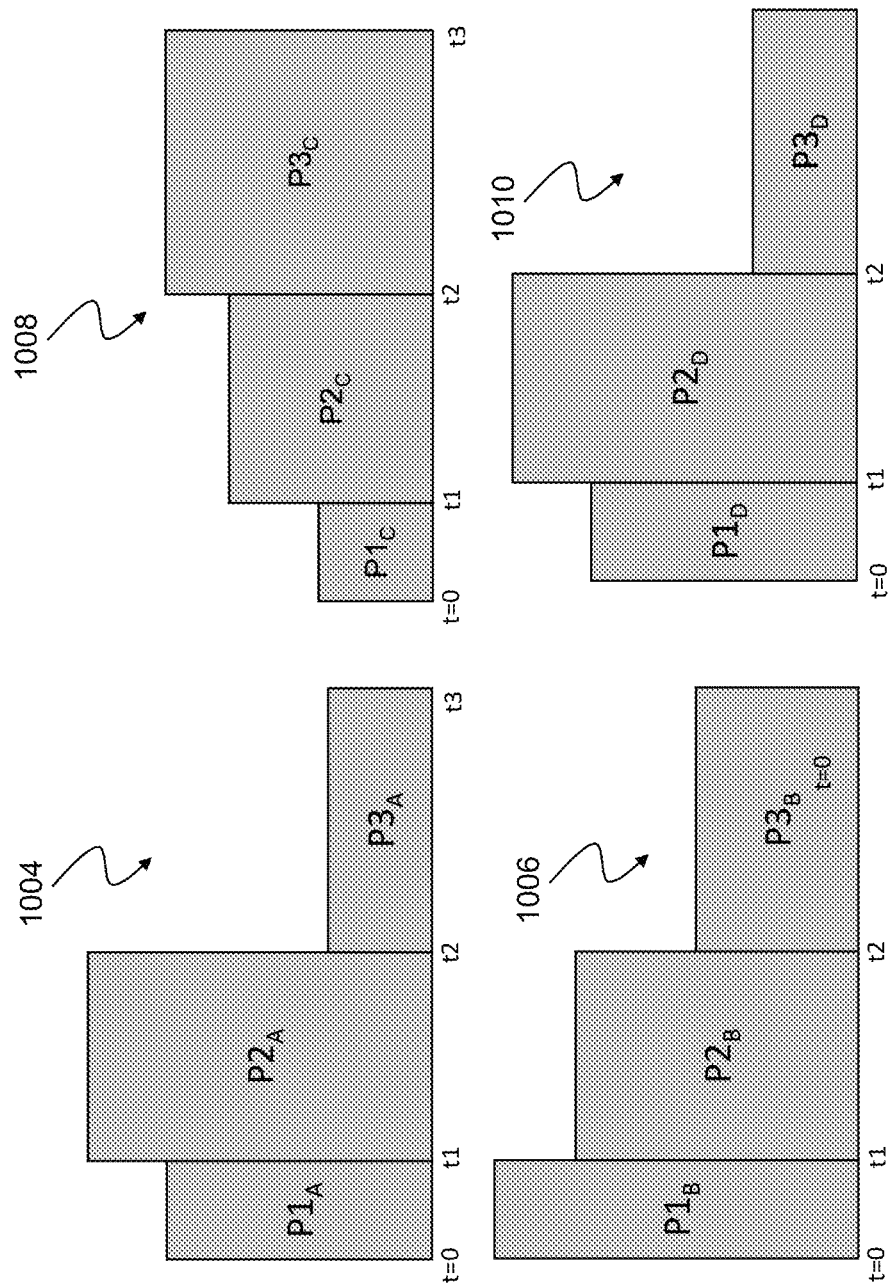
FIG. 10B shows an example of the generation of transient power profiles for the blocks on an IC according to one embodiment.

FIG. 10A shows an example of four blocks A, B, C, D on an IC 1002. FIG. 10B show an example generating transient power profiles for the four blocks A, B, C, D on an IC 1002. In one embodiment, a transient power profile 1004 can be generated for the block A. The transient power profile 1004 can include $P1_A$ for a zero to t1, $P2_A$ from t1 to t2, and $P3_A$ from t2 to t3. The transient power profile 1006 can include $P1_B$ for a zero to t1, $P2_B$ from t1 to t2, and $P3_B$ from t2 to t3. The transient power profile 1008 can include Plc for a zero to t1, $P2_C$ from t1 to t2, and $P3_C$ from t2 to t3. The transient power profile 1010 can include $P1_C$ for a zero to t1, $P2_C$ from t1 to t2, and $P3_C$ from t2 to t3.

Figure 11:
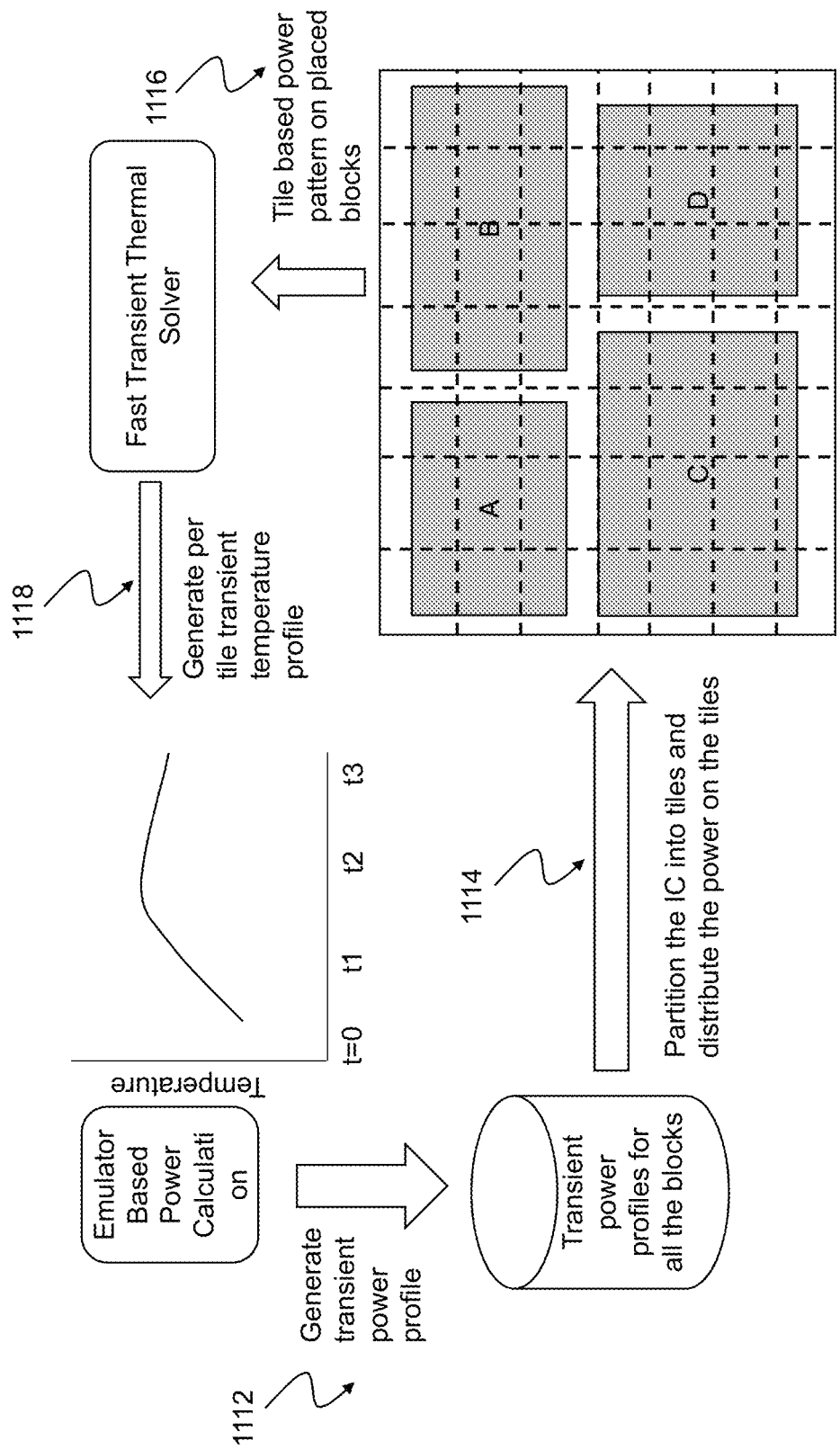
FIG. 11 shows an example of an emulator based fast transient thermal profile according to one embodiment.

FIG. 11 shows a method according to an embodiment using an emulator based fast transient thermal profile. In step 1112, an emulator based power calculation can be used to generate a transient power profile for all the blocks on an IC. In step 1114, the IC can be partitioned into tiles and the transient power can be distributed on the tiles. In step 1116, tile based power patterns for the blocks on the IC can be determined. The tiles based power pattern can be used as an input to the fast transient thermal solver to generate per tile transient temperature profile in step 1118.

The methods and systems described herein may be implemented using any suitable processing system with any suitable combination of hardware, software and/or firmware, such as described below with reference to the non-limiting example of FIG. 12.

Figure 12:
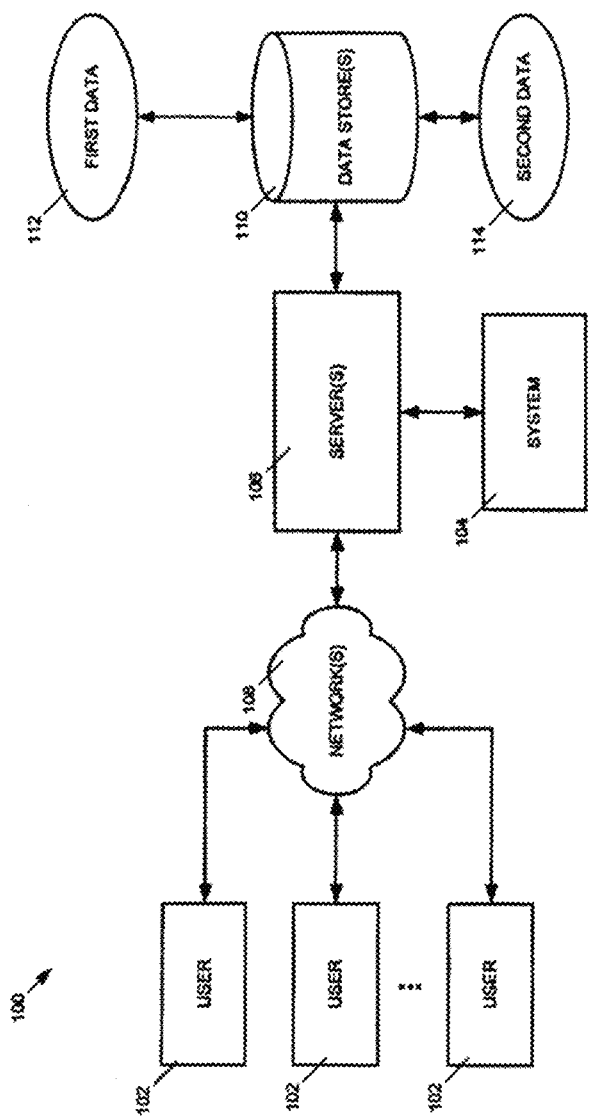
FIGS. 12, 13A-13C depict example systems which may be used in conjunction with the embodiments described herein.

FIG. 12 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figures 13A, 13B:
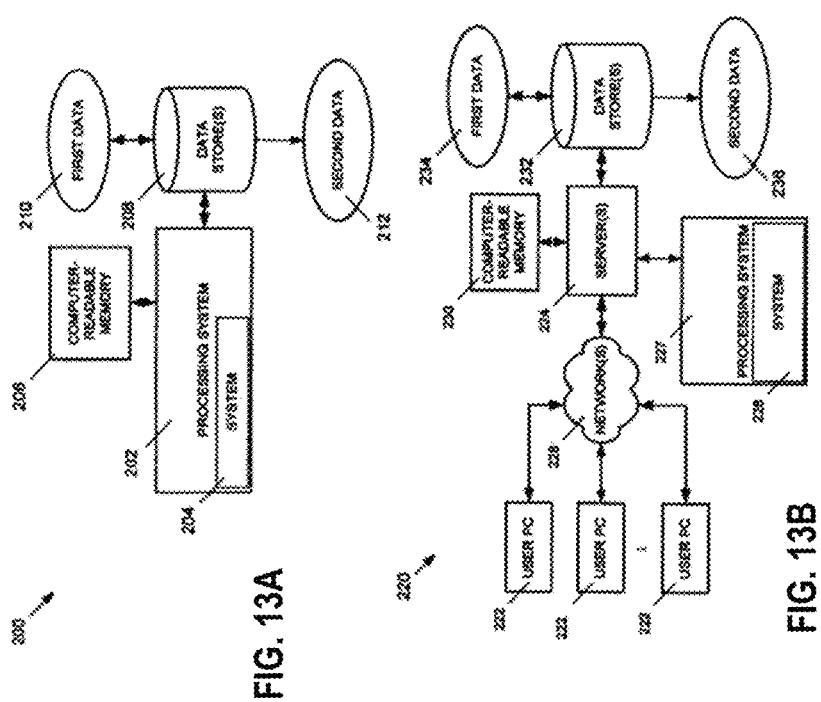
Figure 13C:
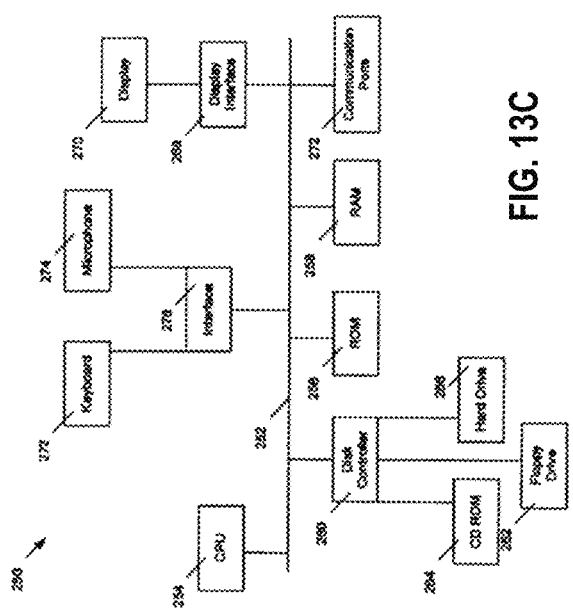

FIGS. 13A, 13B, and 13C depict example systems for use in implementing a system. The data processing system shown in FIGS. 12-13C can be used to train a temperature rise predictor, and the same data processing system can be used to determine a thermal behavior of a given tile on an integrated circuit (IC) using the trained predictor. As another example, the data processing system shown in FIGS. 12-13C can be used after a predictor has been trained by another system to determine a thermal behavior of a given tile on an integrated circuit (IC) using the trained predictor.

For example, FIG. 13A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 13B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 13C shows a block diagram of exemplary hardware for a standalone computer architecture 250, such as the architecture depicted in FIG. 13A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus.

Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
generating a representation of two or more templates identifying different portions of an integrated circuit (IC), each template comprising a plurality of tiles, and each template associated with location parameters to identify a corresponding portion of the IC partitioned according to the plurality of tiles of the template;
performing a thermal simulation for a corresponding portion of the IC identified by each respective template based on a time based sequence of power patterns of tiles of the respective template, the sequence of power patterns separately applied during a sequence of time durations, the thermal simulation determining a sequence of temperatures for the respective template at an end of each of the time durations, each power pattern corresponding to a set of power levels to separately power the tiles of the respective template, each power level selected for the respective template from a set of predefined power levels, the sequence of the power patterns determined for the respective template based on a transient power profile for the IC;
generating two or more sets of training data from results of thermal simulations performed, each set of training data generated based on whether a template used in generation of the set of training data identifies a portion of the IC located at corners of the IC, along a border of the IC, or within an interior of the IC; and
training neural networks based on the sets of training data generated via the thermal simulations performed, each neural network trained with a respective one of the sets of training data, the neural networks to predict a thermal behavior of a given tile of the IC based on whether the given tile of the IC is located at a corner of the IC, along the border of the IC, or within the interior of the IC.

2. The medium as in claim 1, each of the plurality of tiles being powered in the thermal simulation at the power level, selected from the set of predefined power levels, to create the power pattern of the predefined power levels for each of the two or more templates.

3. The medium as in claim 1, the method further comprising:
generating a sequence of time-power tuples from the transient power profile for the IC to represent the power pattern of the predefined power levels for each of the two or more templates, each of the power pattern in the sequence of time-power tuples applied based on an order of the sequence of time-power tuples.

4. The medium as in claim 3, wherein the thermal simulation is based on a set of a plurality of inputs comprising: (1) a predetermined location of the template, (2) a relationship between a change in temperature relative to a power applied to the IC in the thermal simulation, (3) and the sequence of time-power tuples, the thermal simulation determining a sequence of temperatures at the end of each time duration in the sequence of time-power tuples representing a plurality of transient temperatures at a center tile within the plurality of tiles for each of the two or more templates.

5. The medium as in claim 4, the determined sequence of temperatures generating a plurality of outputs associated with the set of a plurality of inputs to the thermal simulation.

6. The medium as in claim 5, the training data comprising the determined sequence of temperatures associated with each of the sequence of time-power tuples and the set of a plurality of inputs to the thermal simulation.

7. The medium as in claim 6, wherein the training of the neural network includes applying the set of a plurality of inputs that were applied to the thermal simulation and the sequence of time-power tuples for the sequence of temperatures to the neural network.

8. The medium as in claim 1, wherein the training provides a trained temperature predictor.

9. The medium as in claim 1, wherein the two or more templates comprise a template along an edge of the IC, a template near a center of the IC, and a template at a corner of the IC, and wherein each of the template along the edge of the IC, the template near the center of the IC, and the template at the corner of the IC is used to generate training data for a respective one of the sets of training data.

10. The medium as in claim 1, wherein the tiles located outside of each template is powered with an average power level during the thermal simulation.

11. The medium as in claim 1, wherein the thermal simulation is performed for each of the two or more templates separately and wherein the thermal simulation includes computational fluid dynamics simulations or finite element simulations.

12. The medium as in claim 5, wherein the neural network is trained with the generated plurality of outputs and the set of a plurality of inputs from each of the thermal simulation.

13. The medium as in claim 4, wherein the relationship between a change in temperature relative to power is Theta JA and wherein the neural network is trained with a range of values of Theta-JA.

14. The medium as in claim 4, wherein the relationship between a change in temperature relative to power used in the thermal simulation is varied across the thermal simulation.

15. The medium as in claim 1, for a selected power pattern, a selected time period is varied to generate a plurality of time-power tuples.

16. The medium as in claim 2, wherein the set of predefined power levels include three or more power levels.

17. The medium as in claim 1, wherein the tiles of each template located outside a border of the IC is powered with a zero power level during the thermal simulation.

18. The medium as in claim 1, wherein each template is divided into a center tile group and a ring tile group.

19. The medium as in claim 18, the tiles in the center tile group are powered with three or more power levels and the tiles in the ring tile group are powered with two power levels to reduce the number of the power pattern during the thermal simulation.

20. A non-transitory machine readable medium storing executable program instructions which when executed by a data processing system cause the data processing system to perform a method, the method comprising:

retrieving from memory, based on whether a thermal behavior of a given tile of an integrated circuit (IC) to be predicted is located at a corner of the IC, along a border of the IC, or within an interior of the IC, one of a plurality of trained neural network models, each of the trained neural network models having been trained with a plurality of inputs and an output derived from a thermal simulation of a corresponding portion of the IC identified by a respective one of a plurality of predetermined templates, each one of the predetermined templates comprising a plurality of tiles and identifying the portion of the IC as being located at corners of the IC, along the border of the IC, or within the interior of the IC according to the plurality of the tiles of the predetermined template, the plurality of inputs comprising a relationship between a change in a temperature relative to a power, and a sequence of time-power-temperature tuples; and determining, using the retrieved trained neural network model, the thermal behavior of the given tile of the IC for a selected time period, a plurality of inputs to the retrieved trained neural network model including: (1) a selected relationship between a change in temperature relative to a power applied to the IC in the thermal simulation, (2) the portion of the IC identified by the predetermined template associated with the retrieved trained neural network model, (3) a selected power pattern for the given tile and (4) a selected current uniform time-dependent temperature of the IC.

21. The medium as in claim 20, wherein the selected power pattern for the given tile is determined based on a total power profile for the IC for the selected time period.

22. The medium as in claim 20, wherein for the selected time period, the given tile and a plurality of neighboring tiles create the selected power pattern.

23. The medium as in claim 20, wherein for the selected time period, the total power profile for the IC is distributed to each tile on the IC.

24. The medium of claim 20, wherein the retrieved trained neural network model determines the predetermined template based on the location of the given tile relative to the predetermined template location.

25. The medium as in claim 20, the method further comprising
updating the selected current uniform time-dependent temperature of the IC based on a predetermined threshold.

26. The medium as in claim 20, wherein the updated selected current uniform time-dependent temperature of the IC includes a midpoint temperature within the selected time period.

27. The medium as in claim 20, wherein determining the thermal behavior of the given tile on the IC includes determining a temperature at the end of the selected time periods for the selected power patterns for the given tile.

28. The medium as in claim 20, the method further comprising:
updating an initial temperature of the given tile on the IC with the determined temperature at the end of selected time period for the selected power pattern for the given tile.

29. The medium as in claim 20, wherein thermal simulation includes computational fluid dynamics simulations or finite element simulations.

* * * * *